(12) United States Patent
Skroski et al.

(10) Patent No.: US 11,955,656 B2
(45) Date of Patent: Apr. 9, 2024

(54) BATTERY PACK FOR AN ELECTRIC AIRCRAFT

(71) Applicant: BETA AIR, LLC, South Burlington, VT (US)

(72) Inventors: Tyler Skroski, Burlington, VT (US); Stuart Denson Schreiber, Essex, VT (US)

(73) Assignee: BETA Air, LLC, South Burlington, VT (US)

( * ) Notice: Subject to any disclaimer, the term of this patent is extended or adjusted under 35 U.S.C. 154(b) by 0 days.

(21) Appl. No.: 17/983,721

(22) Filed: Nov. 9, 2022

(65) Prior Publication Data

US 2023/0178842 A1 Jun. 8, 2023

Related U.S. Application Data

(60) Provisional application No. 63/279,713, filed on Nov. 16, 2021.

(51) Int. Cl.
*H01M 50/317* (2021.01)
*H01M 10/04* (2006.01)
*H01M 10/653* (2014.01)
*H01M 10/658* (2014.01)
*H01M 50/211* (2021.01)
(Continued)

(52) U.S. Cl.
CPC ......... *H01M 50/317* (2021.01); *H01M 10/04* (2013.01); *H01M 10/653* (2015.04); *H01M 10/658* (2015.04); *H01M 50/211* (2021.01); *H01M 50/218* (2021.01);
(Continued)

(58) Field of Classification Search
CPC ............ H01M 50/317; H01M 50/249; H01M 50/533; H01M 50/211; H01M 50/505; H01M 50/218; H01M 10/653; H01M 10/658; H01M 10/04
See application file for complete search history.

(56) References Cited

U.S. PATENT DOCUMENTS 6,709,783 B2 3/2004 Ogata et al.
7,226,694 B2 6/2007 Asahina et al.
(Continued)

FOREIGN PATENT DOCUMENTS

WO WO-2011013905 A2 * 2/2011 .......... H01M 10/613
WO 2013083237 6/2013
(Continued)

*Primary Examiner* — Jimmy Vo
(74) *Attorney, Agent, or Firm* — Hoffman Warnick LLC

(57) ABSTRACT

A battery pack for an electric aircraft is disclosed. The battery pack may include a pouch cell within a sealed environment, wherein the pouch cell may include a pair of electrodes, wherein the pair of electrodes is configured to carry electrical current. The pouch cell may include an insulator layer, the insulator layer located between the pair of electrodes. The pouch cell may include an electrolyte within the pouch cell. The pouch cell may include a pouch, the pouch substantially surrounding the pair of electrodes, the electrolyte and the insulator layer. The pouch cell may include a pair of foil tabs in electrical communication with the pair of electrodes and emanating from the sealed environment. The pouch cell may include a seal, wherein the seal is configured to seal about the pair of foil tabs and prevent a flow of cell ejecta from a thermal runaway.

20 Claims, 9 Drawing Sheets

(51) Int. Cl.
 *H01M 50/218* (2021.01)
 *H01M 50/249* (2021.01)
 *H01M 50/505* (2021.01)
 *H01M 50/533* (2021.01)

(52) U.S. Cl.
 CPC ....... *H01M 50/249* (2021.01); *H01M 50/505* (2021.01); *H01M 50/533* (2021.01); *H01M 2220/20* (2013.01)

(56) References Cited

U.S. PATENT DOCUMENTS

| | | |
|---|---|---|
| 7,790,310 B2 | 9/2010 | Bechtold et al. |
| 8,967,529 B1 | 3/2015 | Bennett |
| 10,062,877 B2 | 8/2018 | Lee et al. |
| 10,686,178 B1 | 6/2020 | Hall et al. |
| 2012/0107668 A1 | 5/2012 | Ling et al. |
| 2017/0104252 A1 | 4/2017 | Wünsche et al. |
| 2020/0044297 A1 | 2/2020 | Omura et al. |
| 2020/0058912 A1 | 2/2020 | Kuramitsu et al. |
| 2020/0075988 A1 | 3/2020 | Omura et al. |
| 2020/0243816 A1 | 7/2020 | Terauchi et al. |
| 2020/0251699 A1 | 8/2020 | Omura |
| 2020/0343508 A1 | 10/2020 | Yoshida et al. |
| 2020/0365855 A1 | 11/2020 | Murayama et al. |
| 2021/0050572 A1 | 2/2021 | Omura et al. |
| 2021/0050582 A1 | 2/2021 | Yoshida et al. |

FOREIGN PATENT DOCUMENTS

| | | | | |
|---|---|---|---|---|
| WO | WO-2015046878 A1 | * | 4/2015 | ............ H01M 10/04 |
| WO | WO-2016181608 A1 | * | 11/2016 | ............ H01M 10/48 |
| WO | WO-2017195480 A1 | * | 11/2017 | |

* cited by examiner

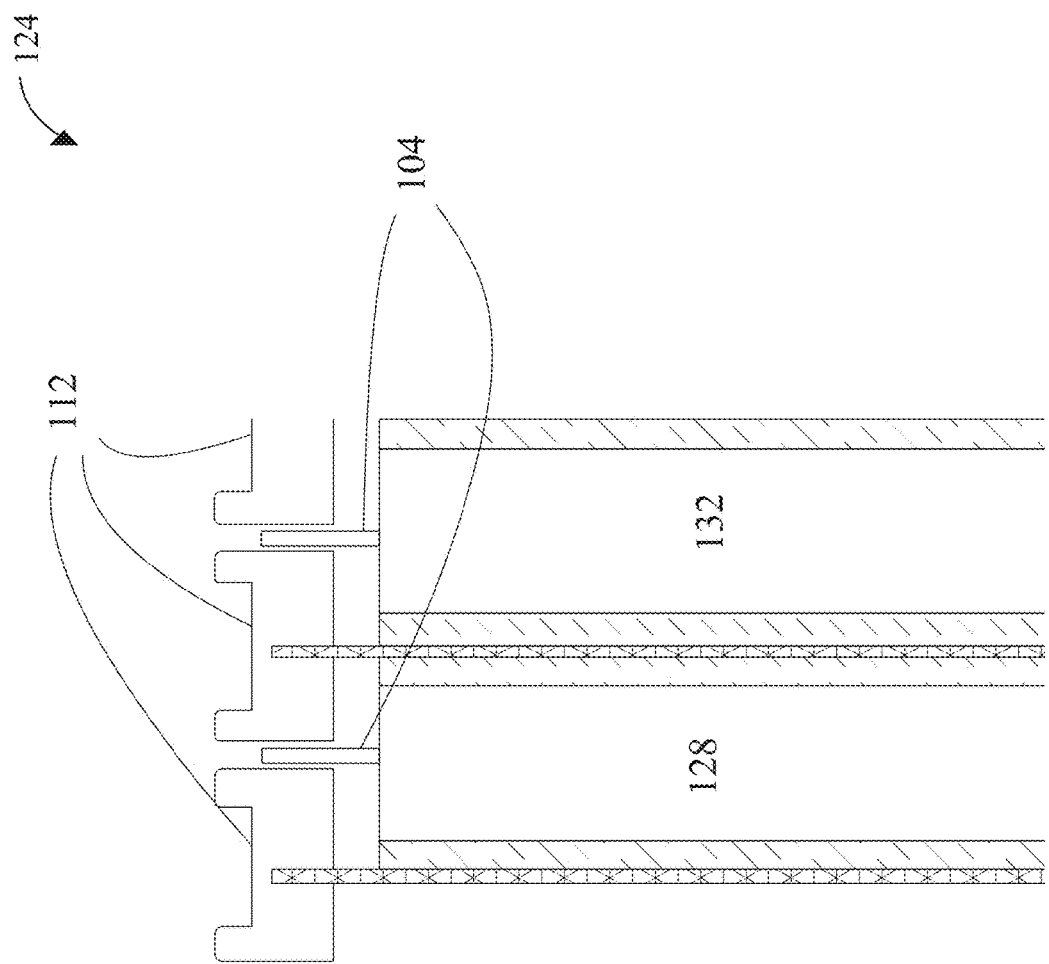

BATTERY PACK FOR AN ELECTRIC AIRCRAFT

CROSS-REFERENCE TO RELATED APPLICATIONS

This application is claiming the benefit of priority, of U.S. Provisional Application No. 63/279,713 filed on Nov. 16, 2021 and entitled "BATTERY PACK FOR AN ELECTRIC AIRCRAFT," the entirety of which is incorporated herein by reference.

FIELD OF THE INVENTION

The present invention generally relates to the field of transportation and aircraft. In particular, the present invention is directed to a battery pack for an electric aircraft.

BACKGROUND

Manned electric vertical take-off and landing (eVTOL) aircraft flight folds the promise of uncongested commuted roadways and air-travel without the presently concomitant fossil fuel usage. Electric aircraft flight requires electric energy storage, for example by way of battery pouch cells. However, battery pouch cells can suffer from thermal runaway such as when a battery pouch cell overheats causing conditions that contribute to further overheating of the battery pouch cell in an uncontrolled positive feedback loop. Conflagration resulting from thermal runaway of a single battery pouch cell is further fueled when thermal runaway progresses to second or third battery pouch cell.

SUMMARY OF THE DISCLOSURE

In an aspect, a battery pack for an electric aircraft is disclosed. The battery pack may include a pouch cell within a sealed environment, wherein the pouch cell may include a pair of electrodes, wherein the pair of electrodes is configured to carry electrical current. The pouch cell may include an insulator layer, the insulator layer located between the pair of electrodes. The pouch cell may include an electrolyte within the pouch cell. The pouch cell may include a pouch, the pouch substantially surrounding the pair of electrodes, the electrolyte and the insulator layer. The pouch cell may include a pair of foil tabs in electrical communication with the pair of electrodes and emanating from the sealed environment. The pouch cell may include a seal, wherein the seal is configured to seal about the pair of foil tabs and prevent a flow of cell ejecta from a thermal runaway.

In another aspect, a method of manufacture for a battery pack for an electric aircraft is disclosed. The method may include assembling a pouch cell comprising a pair of electrodes, an insulator layer, a pouch, an electrolyte, a pair of foil tabs, and a seal. In some embodiments, obtaining the pouch cell may include locating an insulator layer between the pair of electrodes. In some embodiments, assembling the pouch cell may include electrically connecting a pair of foil tabs with the pair of electrodes. In some embodiments, assembling the pouch cell may include obtaining the electrolytes within the pouch cell. In some embodiments, assembling the pouch cell may include substantially surrounding, using the pouch, the pair of electrodes, the electrolyte and the insulator layer. In some embodiments, assembling the pouch cell may include sealing, using a seal, about the pair of foil tabs, wherein the seal is configured to prevent a flow of cell ejecta from a thermal runaway.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1B is a cross section of an exemplary embodiment of a portion of a battery pack;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a battery pack for an electric aircraft. In an embodiment, an electric aircraft may include a battery pack for preventing progression of thermal runaway between battery cells. Some embodiments may include methods of manufacture for a battery pack for preventing progression of thermal runaway between modules. In some embodiments, aspects of the present disclosure may allow for sealing a portion of a pouch cell to prevent a flow of cell ejecta from a thermal runaway.

Aspects of the present disclosure can be used to produce an ablative residue as a function of the insulative barrier resulting from thermal runaway of a first battery cell, thereby preventing the cell ejecta from contributing to thermal runaway of a second battery cell. Aspects of the present disclosure can also be used to alter and/or modify cell ejecta resulting from heating (e.g., non-thermal runaway conditions) of a first battery cell. This is so, at least in part, because an ablative resin interacts with the cell ejecta to produce the ablative residue, wherein the ablative residue is vented as a function of the vent.

Aspects of the present disclosure allow for vented materials from a battery cell to be isolated away from other battery cells as they are being vented. This may prevent ablative residue, cell ejecta, electrolyte vapors, off-gas, and the like thereof from a first battery cell from influencing thermal conditions of a second battery cell. Further aspects of the present disclosure may also be used with one or more pouch or prismatic battery cells. In some cases, battery pouch cells may allow for packaging efficiencies in excess of 90% or even 95% compared to other (e.g., can) battery cell packaging systems. Additionally, in some cases, pouch cells may be configured to reduce a weight of a battery pack. In order to realize the potential offered by electric vertical take-off and landing (eVTOL) aircraft batteries must be available that are space and weight efficient and above all safe and reliable. In some embodiments, battery packs according to the present disclosure may be configured for use in eVTOL aircraft and may help to one day fully realize the potential of eVTOL flight. Exemplary embodiments illustrating aspects of the present disclosure are described below in the context of several specific examples.

Figure 1A:
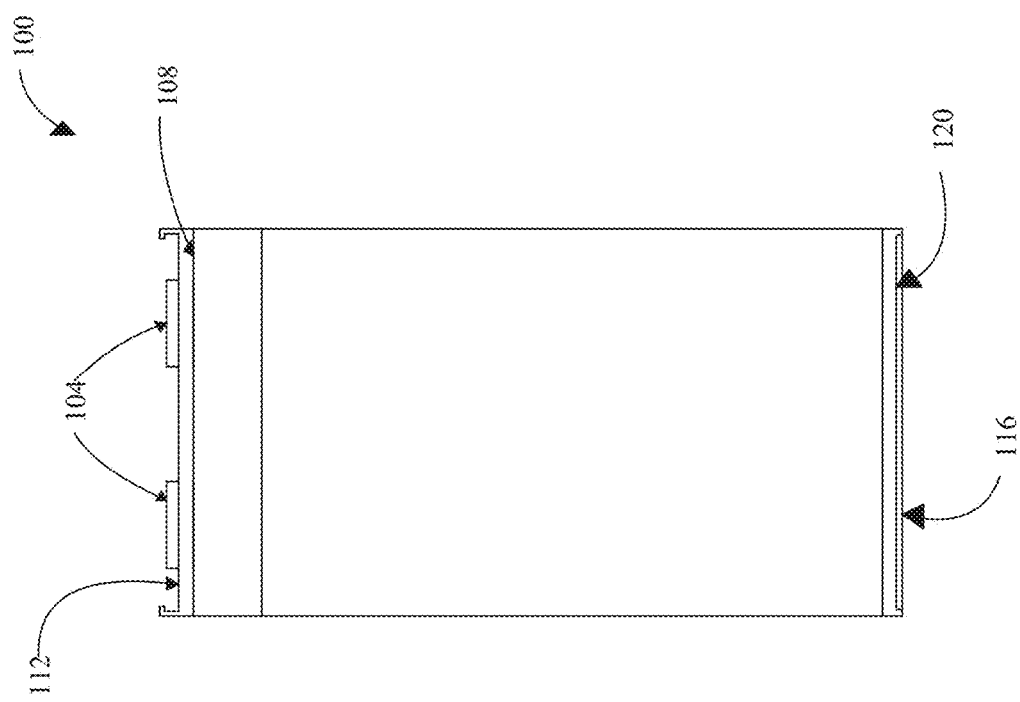
FIG. 1A is a diagram of an exemplary embodiment of a pouch battery cell with a vent of the pouch battery cell.

Referring to FIG. 1A, an exemplary embodiment of a pouch cell 100 is shown. As used in this disclosure, a "pouch cell" is a type of battery cell or battery module that includes a pouch. In some embodiments, pouch cell 100 may include a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. In some embodiments, pouch cell 100 may include lead-based batteries such as without limitation lead acid batteries and lead carbon batteries. In some embodiments, pouch cell 100 may include lithium sulfur batteries, magnesium ion batteries, and/or sodium ion batteries. In some embodiments, pouch cell 100 may include solid state batteries or supercapacitors or another suitable energy source. In another non-limiting embodiment, pouch cell 100 may include an electrochemical reaction configured to produce electrical energy. For example and without limitation, the electrical energy produced by pouch cell 100 may be sufficient to power at least a portion of an electric vehicle, such as without limitation an electric motor of an eVTOL aircraft. In some embodiments, pouch cell 100 may include electrochemical cells, galvanic cells, electrolytic cells, fuel cells, flow cells, voltaic cells, and/or any combination thereof.

With continued reference to FIG. 1A, in some embodiments, pouch cell 100 may include a pair of electrodes. As used in this disclosure, an "electrode" is an electrically conductive material. As used in this disclosure, a "pair of electrodes" is a positive and a negative electrode. Non-limiting exemplary electrically conductive elements may include braided wire, solid wire, metallic foil, circuitry, such as printed circuit boards, and the like. In some embodiments, pouch cell 100 may include a pair of foil tabs 104. As used in this disclosure, a "tab" is a portion of an electrode that makes contact with a nonmetallic device. In some embodiments, the pair of electrodes may be in electric communication with the pair of foil tabs 104. The pair of electrodes may be bonded with at least a pair of foil tabs 104 by any known method, including without limitation welding, brazing, soldering, adhering, engineering fits, electrical connectors, and the like. In some cases, the pair of foil tabs 104 may include a cathode and an anode. As used in this disclosure, a "cathode" is a type of electrode that acquires electrons from an external circuit and is reduced during the electrochemical reaction. As used in this disclosure, an "anode" is a type of electrode that releases electrons to an external circuit and oxidizes during and electrochemical reaction. In some cases, an exemplary cathode may include a lithium-based substance, such as lithium-metal oxide, bonded to an aluminum tab. In some cases, an exemplary anode may include a carbon-based substance, such as graphite, bonded to a copper tab.

With continued reference to FIG. 1A, in some embodiments, the pair of foil tabs 104 may be configured to electrically connect with a bus bar. For the purposes of this disclosure, a "bus bar" or a "bus" is an electrically conductive pathway connecting at least a component in a system configured to convey electrical energy between components. The bus bar may include one or more electrically conductive pathways configured to transfer electrical energy across the pathways to convey electrical energy from one component to one or more other components. Bus bar may include, without limitation, one or more metallic strips and/or bars. Bus bar may include a ring bus. For the purpose of this disclosure, a "ring bus" is a bus element wherein circuit breakers are connected to form a ring with isolators on both sides of each circuit breaker. Ring bus may include component configured to isolate a fault by tripping two circuit breakers while all other circuits remain in service. Bus bar may be disposed in or on a switchgear, panel board, busway enclosure, a plurality of energy storage elements, any portion of electric aircraft, a plurality of propulsors, or a combination thereof. A bus bar may also be used to connect high voltage equipment at electrical switchyards, and low voltage equipment in plurality of energy storage elements. Bus bar may be uninsulated; bus bar may have sufficient stiffness to be supported in air by insulated pillars. These features allow sufficient cooling of the conductors, and the ability to tap in at various points without creating a new joint. A bus bar may include material composition and cross-sectional size configured to conduct electricity where the size and material determine the maximum amount of current that can be safely carried. A bus bar may be produced in a plurality of shapes including flat strips, solid bars, rods, or a combination thereof. A bus bar may be composed of copper, brass, aluminum as solid or hollow tubes, in embodiments. A bus bar may include flexible buses wherein thin conductive layers are sandwiched together; such an arrangement may include a structural frame and/or cabinet configured to provide rigidity to bus bar. A bus bar may include distribution boards configured to split the electrical supply into separate circuits at one location. Busways, or bus ducts, are long busbars with a protective cover. Rather than branching from the main supply at one location, they allow new circuits to branch off anywhere along the route of the busway. Bus bar may either be supported on insulators, or else insulation may completely surround it. Bus bars are protected from accidental contact either by an enclosure or by design configured to remove it from reach. Bus bar may be connected to each other and to electrical apparatus by bolted, clamped, or welded connections. Joints between high-current bus bar sections have precisely machined matching surfaces that are silver-plated to reduce the contact resistance. Electrical bus may refer to power busses, audio busses, video busses, computing address busses, and/or data busses. Additionally without limitation, more disclosure related to a pair of tab and a bus may be found in U.S. patent application Ser. No. 17/839,887, filed on Jun. 14, 2022, entitled as "BATTERY PACK FOR A CARBON FIBER POUCH CELL CASING CONFIGURED TO COOL BATTERY CELLS," which is incorporated in its entirety herein by reference.

With continued reference to FIG. 1A, in some embodiments, pouch cell 100 may include an insulator layer. As used in this disclosure, an "insulator layer" is an electrically insulating material that is substantially permeable to battery ions, such as without limitation lithium ions. In some cases, the insulator layer may be referred to as a separator layer or simply separator. In some cases, the insulator layer may be included and configured to prevent electrical communication directly between a pair of foil tabs 104 (e.g., cathode and anode). In some cases, the insulator layer may be configured to allow for a flow of ions across it. In some embodiments, the insulator layer may consist of a polymer, for example polyolifine (PO). In some embodiments, the insulator layer may include pours which are configured to allow for passage of ions, for example lithium ions. In some cases, pours of a PO insulator layer may have a width no greater than 100 μm, 10 μm, or 0.1 μm. In some cases, a PO insulator layer may have a thickness within a range of 1-00 μm, or 10-30 μm.

With continued reference to FIG. 1A, in some embodiments, pouch cell 100 may include a pouch. As used in this disclosure, a "pouch" is an object that encompasses at least the electrolyte of a pouch battery cell. In some embodiments, pouch may encompass an electrode, an electrolyte, and the like. In some embodiments, the pouch may be made of a metal, such as aluminum. In some embodiments, the pouch may be made of a polymer, such as polypropylene, polyamide, or polybutylene terephthalate, for example. In some embodiments, the pouch may include a layer of metal sandwiched between two pieces of polymer. As an example, the pouch may include a piece of aluminum sandwiched between a layer of polypropylene and a layer of polyamide. In some embodiments, pouch cell 100 may include or be referred to as a prismatic pouch cell, for example when an overall shape of the pouch is prismatic. In some embodiments, pouch cell 100 may include the pouch which is substantially flexible. Alternatively or additionally, in some embodiments, the pouch may be substantially rigid. In some embodiments, the pouch may be configured to substantially encompass a pair of foil tabs 104 and a portion of an insulator layer. In an embodiment, and without limitation, the pouch may be coated with one or more coatings. For example, in some cases, the pouch may have an outer surface coated with a metalizing coating, such as an aluminum or nickel containing coating. In some cases, the pouch coating may be configured to electrically ground and/or isolate the pouch, increase pouches impermeability, increase pouches resistance to heat, increases pouches thermal resistance (insulation), and the like. In some embodiments, the pouch may substantially surround the electrolyte, insulator layer, and electrode. For example, the pouch may "substantially surround" as opposed to "completely surround" due to one or more apertures in the pouch through which objects, such as foil tabs may pass.

With continued reference to FIG. 1A, in some embodiments, pouch cell 100 may include a first side 108. In some embodiments, the first side 108 of pouch cell 100 may include a pair of foil tabs 104. In some embodiments, the first side 108 of pouch cell 100 may include seal 112. In an embodiment, seal 112 may seal the entire surface of first side 108 of pouch cell. In another embodiment, seal 112 may seal a portion of first side 108 of pouch cell 100 while a portion of a pair of foil tabs 104 emanating from seal 112. In some embodiments, seal 112 may seal a portion of the pair of foil tabs 104. As a non-limiting example, seal 112 may encompass a portion of the pair of foil tabs 104, while seal 112 allow a portion of the pair of foil tabs 104 that is not sealed to electrically connect with a bus.

With continued reference to FIG. 1A, as used in this disclosure, a "seal" is an object or substance that. As a non-limiting example, the substance may include air, liquid, solid, gel, current, temperature, and/or the like. As another non-limiting example, the substance may include cell ejecta from pouch cell 100 during a thermal runaway. As used in this disclosure, "cell ejecta" is any material that has been ejected, for example from pouch cell 100. In some cases, the cell ejecta may be ejected during a thermal runaway of pouch cell 100. Alternatively or additionally, in some cases, the cell ejecta may be ejected without the thermal runaway of pouch cell 100. In some cases, the cell ejecta may include lithium-based compounds. Alternatively or additionally, the cell ejecta may include carbon-based compounds, such as without limitation carbonate esters. The cell ejecta may include matter in any phase or form, including solid, liquid, gas, vapor, and the like. In some cases, the cell ejecta may undergo a phase change, for example the cell ejecta may be vaporous as it is initially being ejected and then cool and condense into a solid or liquid after ejection.

With continued reference to FIG. 1A, as used in this disclosure, a "thermal runaway" is a phenomenon in which a battery cell enters an uncontrollable, self-heating state. In some embodiments, the thermal runaway may occur when pouch cell 100 develops lower resistances or lower triggering voltages as the internal temperature increases. In some embodiments, as current flow gets markedly increased, increased power dissipation may raise the temperature further. As a non-limiting example, during the thermal runaway, the temperature of pouch cell 100 may increase up to 1000° C., 1200° C., 1600° C., 1800° C., or the like. In some embodiments, the temperature of pouch cell 100 may be less than 1000° C. "Temperature," as used in this disclosure, and as would be appreciated by someone of ordinary skill in the art, is a measure of the heat energy of a system. In some embodiments the temperature may be measured in Fahrenheit (° F.), Celsius (° C.), Kelvin (° K), or another scale alone or in combination.

With continued reference to FIG. 1A, in some embodiments, during a thermal runaway, a pressure of pouch cell 100 may increase. As used in this disclosure, "pressure" is the force applied perpendicular to the surface of an object per unit area over which that force is distributed. In some embodiments, the pressure may be measured in pascal (Pa), pound-force per square inch (psi), standard atmospheric pressure (atm), torr, manometric units such as without limitation centimetre of water, millimeter of mercury, inch of mercury, and the like. In some embodiments, as the pressure of pouch cell 100 increases, a pressure difference between pouch cell 100 and outside of pouch cell 100 may increase. As used in this disclosure, "pressure difference" is a difference in pressure between two different points. As a non-limiting example, the two different points may be inside of pouch cell 100 and the outside of pouch cell 100. In some embodiments, the pressure of the inside of pouch cell 100 may be 80 psi. In an embodiment, the pressure of the inside of pouch cell 100 may be greater than 80 psi. In another embodiment, the pressure of the inside of pouch cell 100 may be less than 80 psi. In an embodiment, the pressure of the outside of pouch cell 100 may be greater than the pressure of the inside of pouch cell 100. In another embodiment, the pressure of the outside of pouch cell 100 may be less than the pressure of the inside of pouch cell 100. As a non-limiting example, during the thermal runaway, the pressure difference between the inside of pouch cell 100 and the outside of pouch cell 100 may be 20 psi, 40 psi, 80 psi, 120 psi, 200 psi, or the like, wherein the pressure of the inside of pouch cell 100 is greater than the pressure of the outside of pouch cell 100.

With continued reference to FIG. 1A, in some embodiments, seal 112 may be thermally insulated. As a non-limited example, seal 112 may thermally insulate a pair of foil tabs 104 when pouch cell 100 experiences a thermal runaway and releases heat. As used in this disclosure, "thermal insulation" is the reduction of heat transfer between objects in thermal contact or in range of radiative influence. In some embodiments, seal 112 may be thermally insulated from a heat flow from a vent of pouch cell 100 experiencing a thermal runaway. As used in this disclosure, "heat flow" is a flow of heat. As a non-limiting example, heat may flow from a second side of pouch cell to a first side of pouch cell during thermal runaway. In some embodiments, seal 112 may include silicone, silica insulator, fibrous matt of silica, aerogel, fiberglass, matrix for aerogel, powdered aerogel, and the like. In some embodiments, seal 112 may be configured to resist high temperature. As a temperature of pouch cell 100 during thermal runaway may increase up to, as a non-limiting example, 1000° C., 1200° C., 1600° C., 1800° C., or the like, seal 112 may be configured to tolerate the temperature of pouch cell 100 during thermal runaway. In some embodiments, seal 112 may include a refractory material. As used in this disclosure, a "refractory material" is a material that is resistant to decomposition by heat, pressure, or chemical attack, and retains strength and form at high temperatures. As a non-limiting example, seal 112 may include mica, silica, firebrick, ceramic, and the like. In some embodiments, seal 112 may include a composite material. As used in this disclosure, a "composite material" is a combination of two materials with different physical and chemical properties.

With continued reference to FIG. 1A, in some embodiments, seal 112 may be electrically insulated. In an embodiment, seal 112 may electrically insulate a portion of a pair of foil tabs 104 when pouch cell 100 experiences a thermal runaway. In another embodiment, seal 112 may electrically insulate a portion of the pair of foil tabs 104 when pouch cell 100 does not experience the thermal runaway. As used in this disclosure, "electrically insulated" means electric current does not flow freely into an insulated material. As a non-limiting example, the portion of the pair of foil tabs 104 that is insulated with seal 112 may not allow a flow of the electric current while another portion of the pair of foil tabs 104 that is not insulated with seal 112 may allow the flow of the electric current.

With continued reference to FIG. 1A, in some embodiments, seal 112 may be airtight. In an embodiment, seal 112 may be airtight when there is a high temperature such as without limitation when pouch cell 100 experiences a thermal runaway. In another embodiment, seal 112 may be airtight at all time. As used in this disclosure, "airtight" also called "hermetically sealed" is any type of sealing that prevents a passage of air, oxygen, other gases, or the like As a non-limiting example, hermetic seal may include epoxy hermetic seal, metal hermetic seal, glass hermetic seal, plastic hermetic seal, ceramic hermetic seal, and the like. Metal hermetic seal may be done by welding metals together. Glass hermetic seal may be done through matched sealed or compression seal on a metal and a glass. Compression seals may withstand temperatures up to 250° C. Matched seals may withstand temperatures up to 450° C. In some embodiments, seal 112 may include an intumescent material. As used in this disclosure, an "intumescent material" is a substance that swells as a result of heat exposure, thus leading to an increase in volume and decrease in density. As a non-limiting example, seal 112 may swell as pouch cell 100 experiences the thermal runaway and releasing heat.

With continued reference to FIG. 1A, in some embodiments, seal 112 may be configured to keep cell ejecta away from a pair of foil tabs 108, wherein the pair of foil tabs 108 is electrically connected to a bus. In some embodiments, seal 112 may be configured to resist a mechanical force that is resulted from a vented cell ejecta during a thermal runaway. As a non-limiting example, the mechanical force may include abrasion by cell ejecta. In some embodiments, seal 112 may include abrasion-resistant material. As a non-limiting example, seal 112 may include mica, ceramics, ceramic coatings, diamond-like carbon coating, silicon wafer, carbon fiber, graphite, and the like.

With continued reference to FIG. 1A, in some embodiments, pouch cell 100 may include second side 116 of pouch cell 100. In some embodiments, second side 116 may include vent 120. As used in this disclosure, a "vent" is a duct that allows air, gas, liquid, or solid to pass out of a confined space. As a non-limiting example, the confined space may include an aircraft, a battery pack, a battery module, a battery cell, and the like. In an embodiment, the battery pack may be a battery pack disclosed with respect to FIG. 2. In another embodiment, the battery cell may include pouch cell 100. In some embodiments, the vent 120 of pouch cell 100 may be configured to discharge cell ejecta from pouch cell 100.

With continued reference to FIG. 1A, in some embodiments, vent 120 may include a check valve. As used in this disclosure, a "check valve" is a valve that permits flow of a fluid only in certain, for example one, direction. In some embodiments, the check valve may be configured to allow for a flow path and/or fluid in substantially one direction. As a non-limiting example, the check valve may allow flow of fluids substantially only away from at least a pouch cell 100 while preventing back flow of vented fluid to at least a pouch cell 100. In another embodiment, vent 120 may include a duckbill valve. As used in this disclosure, a "duckbill valve" is a type of check valve that has lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. Additionally, without limitation, the vent disclosed herein may be consistent with a vent disclosed in U.S. patent application Ser. No. 17/983, 664, filed on Nov. 9, 2022, entitled as "HEAT-DISSIPATING BATTERY PACK", which is incorporated in its entirety herein by reference.

With continued reference to FIG. 1A, in some embodiments, first side 108 of pouch cell 100 may be placed opposite of second side 116. In an embodiment, the second side 116 may be configured to tolerate higher temperature than a first side 108 of pouch cell 100. As a non-limiting example, second side 116 with vent 120 may tolerate 1200° C. during thermal runaway while first side 108 may tolerate a heat flow from second side 116. In another embodiment, second side 116 with vent 120 may be configured to tolerate more mechanical force than first side 108 of pouch cell 100. As a non-limiting example, second side 116 that discharges cell ejecta with vent 120 may tolerate abrasion force during thermal runaway while first side 108 may tolerate abrasion force that is resulted from second side 116.

With continued reference to FIG. 1A, in some embodiments, pouch may contain an electrolyte. As used in this disclosure, an "electrolyte" is a substance that allows electrical current to flow between anode and cathode. In some embodiments, the anode and the cathode may be a pair of foil tabs 104. In some embodiments, the electrolyte may contact one or both of a pair of foil tabs 104. In some embodiments, the electrolyte may include a gel, such as a lithium polymer. In some embodiments, the electrolyte may include a wet paste. In some embodiments, the electrolyte may include a liquid such as, for example a liquid containing lithium salts (e.g. $LiPF_6$, $LiBF_4$, $LiClO_4$). In some embodiments, these lithium salts may be in an organic solvent, such as, for example, ethylene carbonate, dimethyl carbonate, or diethyl carbonate. In some embodiments, the electrolyte may contain solids. In these embodiments, as a non-limiting example, the electrolyte may include lithium metal oxides. In some embodiments, the electrolyte may include an inorganic compound, such as but not limited to ammonium chloride, zinc chloride, and the like. In some embodiments, the electrolyte may include liquid acid. In some embodiments, electrolyte is an alkaline solution. In some embodiments, the electrolyte may be in dry format.

With continued reference to FIG. 1A, additionally without limitation, pouch cell 100 may be consistent with any pouch cell disclosed in U.S. patent application Ser. No. 17/839,887, filed on Jun. 14, 2022, entitled as "BATTERY PACK FOR A CARBON FIBER POUCH CELL CASING CONFIGURED TO COOL BATTERY CELLS," which is incorporated in its entirety herein by reference.

Referring now to FIG. 1B, a cross section of an exemplary embodiment of a portion of battery pack 124 is disclosed. In some embodiments, battery pack 124 may include a plurality of pouch cell 100. As a non-limiting example, the plurality of pouch cell 100 may include first pouch cell 128 and second pouch cell 132. In some embodiments, first pouch cell 128 and second pouch cell 132 disclosed herein may be consistent with first pouch cell 204 and second pouch cell 216 disclosed with respect to FIG. 2. In some embodiments, battery pack 124 may include a pair of foil tabs 104. A portion of the pair of foil tabs 104 is shown in FIG. 1A. In some embodiments, battery pack 124 may include seal 112. In some embodiments, portion of battery pack 124 may include a plurality of seal 112. In some embodiments, seal 112 may encompass a portion of the pair of foil tabs 104. In some embodiments, seal 112 may seal a plurality of the pair of foil tabs 104. Additionally without limitation, battery pack 124 may illustrate a portion of battery pack 200 disclosed with respect to FIG. 2.

Figure 2:
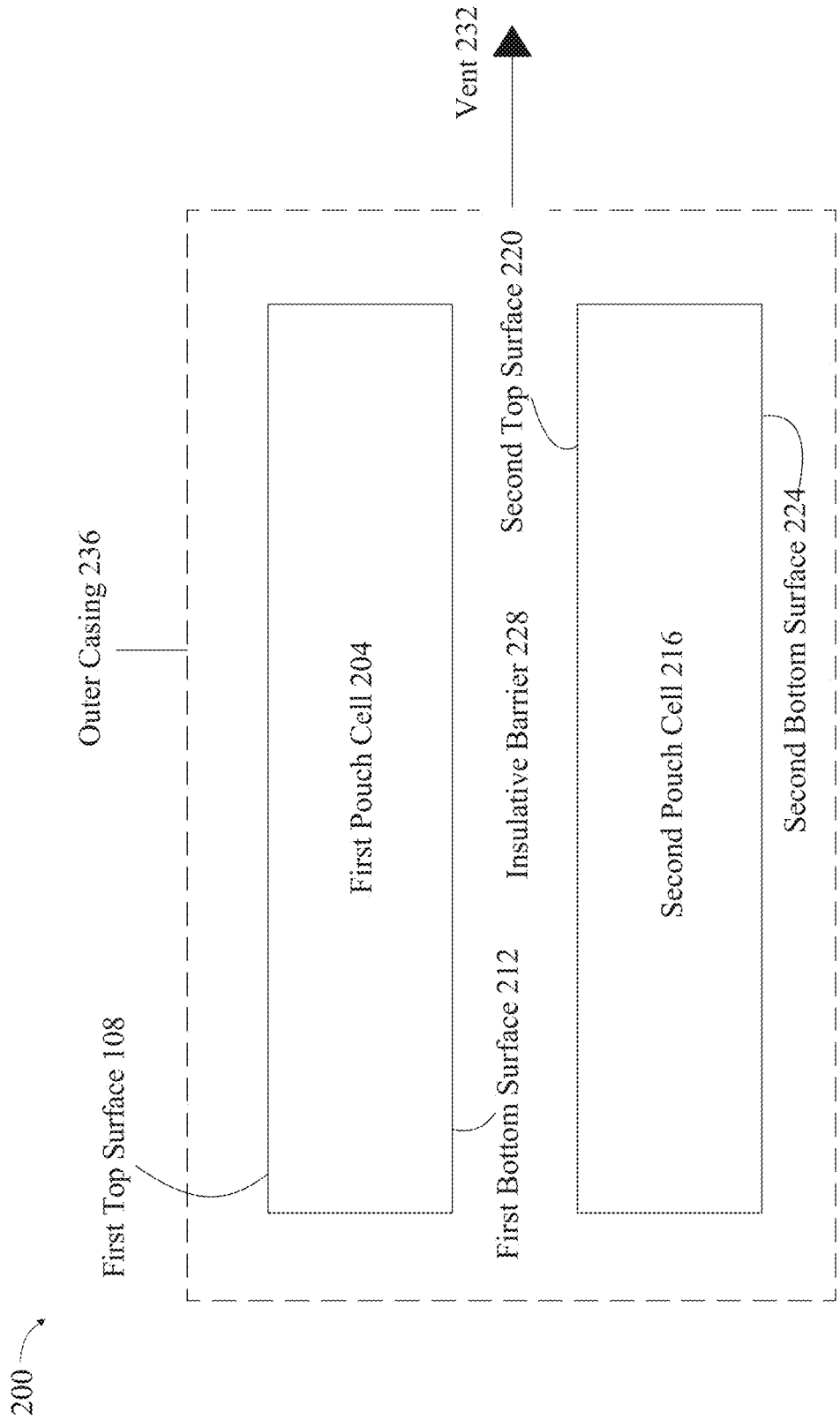
FIG. 2 is a block diagram illustrating an exemplary battery pack for an electric aircraft.

Referring now to FIG. 2, FIG. 2 illustrates a block diagram of an exemplary battery pack 200 for an electric aircraft. Battery pack 200 includes a first pouch cell 204. In some embodiments, first pouch cell 204 may be consistent with pouch cell 200. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, pouch may be substantially rigid. First cell pouch 204 includes a first top surface 208. As used in this disclosure a "top surface" is an upper surface of a pouch cell, wherein the surface is oriented at a position that is furthest from the ground. Additionally or alternatively, first cell pouch 204 includes a first bottom surface 212. As used in this disclosure a "bottom surface" is a lower surface of a pouch cell, wherein the surface is oriented at a position that is closest to the ground. In an embodiment, and without limitation, first pouch cell 204 may include a first pair of electrodes. In an embodiment, and without limitation, first pouch cell 204 may include a first pair of foil tabs, wherein the first pair of foil tabs may be in electric communication and/or electrically connected to first pair of electrodes. In an embodiment, and without limitation, first pair of foil tabs may be bonded in electric communication with and/or electrically connected to pair of first pair of electrodes by any known method, including without limitation welding, brazing, soldering, adhering, engineering fits, electrical connectors, and the like. In some cases, the first pair of foil tabs may include a cathode and an anode. In some cases, an exemplary cathode may include a lithium-based substance, such as lithium-metal oxide, bonded to an aluminum foil tab. In some cases, an exemplary anode may include a carbon-based substance, such as graphite, bonded to a copper tab. First pouch cell may include a first insulator layer. In some cases, insulator layer may be referred to as a separator layer or simply separator. In an embodiment, and without limitation, the first insulator layer may be configured to prevent electrical communication directly between the first pair of foil tabs such as, but not limited to a cathode and an anode. In some cases, the first insulator layer may be configured to allow for a flow ions across it. The first insulator layer may consist of a polymer, such as without limitation polyolifine (PO). The first insulator layer may comprise pours which are configured to allow for passage of ions, for example lithium ions. In some cases, pours of a PO first insulator layer may have a width no greater than 100 µm, 10 µm, or 0.1 µm. In some cases, a PO first insulator layer may have a thickness within a range of 1-100 µm, or 10-50 µm.

With continued reference to FIG. 2, first cell pouch 204 may include a first pouch. First pouch may be configured to substantially encompass first pair of foil tabs and a portion of first insulator layer. In some cases, first pouch may include a polymer, such as without limitation polyethylene, acrylic, polyester, and the like. In an embodiment, and without limitation, first pouch may be coated with one or more coatings. For example, in some cases, first pouch may have an outer surface coated with a metalizing coating, such as an aluminum or nickel containing coating. In some cases, pouch coating be configured to electrically ground and/or isolate pouch, increase pouches impermeability, increase pouches resistance to heat, increases pouches thermal resistance (insulation), and the like. Additionally or alternatively, first pouch cell 204 may include a first electrolyte, wherein first electrolyte may be located within first pouch. In some cases, first electrolyte may comprise a liquid, a solid, a gel, a paste, and/or a polymer. In an embodiment, and without limitation, first electrolyte may wet and/or contact one and/or both of first pair of foil tabs. In some embodiments, first pouch cell 204 may include a vent. The vent disclosed herein may be consistent with vent 120. Additionally, without limitation, the vent disclosed herein may be consistent with a vent disclosed in U.S. patent application Ser. No. 17/983,664, filed on Nov. 9, 2022, entitled as "HEAT-DISSIPATING BATTERY PACK", which is incorporated in its entirety herein by reference.

With continued reference to FIG. 2, battery pack 200 may include a second pouch cell 216. In some embodiments, second pouch cell 216 may be consistent with pouch cell 100. Second pouch cell 216 includes a second top surface 220, wherein a top surface is an upper surface of a pouch cell, wherein the surface is oriented at a position that is furthest from the ground as described above. Additionally or alternatively, second pouch cell 216 includes a second bottom surface 224, wherein a second bottom surface is a lower surface of a pouch cell, wherein the surface is oriented at a position that is closest to the ground as described above. In an embodiment, and without limitation, second pouch cell 216 may include a second pair of electrodes, wherein a pair of electrodes is a positive and a negative electrode, wherein an electrode is an electrically conductive element as described above. In another embodiment, and without limitation, second pouch cell 216 may include a second pair of foil tabs, wherein the second pair of foil tabs may be in electric communication and/or electrically connected to second pair of electrodes. In an embodiment, and without limitation, second pair of foil tabs may be bonded in electric communication with and/or electrically connected to pair of first pair of electrodes by any known method, including without limitation welding, brazing, soldering, adhering, engineering fits, electrical connectors, and the like. Additionally or alternatively, and without limitation, second pouch cell 216 may include a second insulator layer, wherein an insulator layer is an electrically insulating material that is substantially permeable to battery ions, such as without limitation lithium ions, as described above. In some cases, insulator layer may be referred to as a separator layer or simply separator. In an embodiment, and without limitation, a second insulator layer may be configured to prevent electrical communication directly between second pair of foil tabs such as, but not limited to a cathode and an anode. In some cases, a second insulator layer may be configured to allow for a flow ions across it. The second insulator layer may consist of a polymer, such as without limitation polyolifine (PO). The second insulator layer may comprise pours which are configured to allow for passage of ions, for example lithium ions. In some cases, pours of a PO second insulator layer may have a width no greater than 100 μm, 10 μm, 1 μm, or 0.1 μm. In some cases, a PO second insulator layer 140 may have a thickness within a range of 1-100 μm, or 10-50 μm.

With continued reference to FIG. 2, second cell pouch 216 may include a second pouch. The second pouch may be configured to substantially encompass second pair of foil tabs and a portion of second insulator layer. In some cases, the second pouch may include a polymer, such as without limitation polyethylene, acrylic, polyester, and the like. In an embodiment, and without limitation, the second pouch may be coated with one or more coatings. For example, in some cases, the second pouch may have an outer surface coated with a metalizing coating, such as an aluminum or nickel containing coating. In some cases, pouch coating be configured to electrically ground and/or isolate pouch, increase pouches impermeability, increase pouches resistance to heat, increases pouches thermal resistance (insulation), and the like. Additionally or alternatively, second pouch cell 216 may include a second electrolyte, wherein second electrolyte 248 may be located within second pouch. In some cases, the second electrolyte 248 may comprise a liquid, a solid, a gel, a paste, and/or a polymer. In an embodiment, and without limitation, the second electrolyte may wet and/or contact one and/or both of second pair of foil tabs. In some embodiments, second pouch cell 216 may include a vent. The vent disclosed herein may be consistent with vent 120. Additionally, without limitation, the vent disclosed herein may be consistent with a vent disclosed in U.S. patent application Ser. No. 17/983,664, filed on Nov. 9, 2022, entitled as "HEAT-DISSIPATING BATTERY PACK", which is incorporated in its entirety herein by reference.

In an embodiment, and with continued reference to FIG. 2, first pouch cell 204 and second pouch cell 216 may be aligned such that first bottom surface 212 of first pouch cell 204 is above second top surface 220. In an embodiment, and without limitation, first bottom surface 212 may be in contact with second top surface 220. As used in this disclosure "contact" is a state and/or condition of physical touching. In an embodiment, and without limitation, contact may include electrical and/or non-electrical contact. In another embodiment, and without limitation, contact may include one or more contacts with an intermediary substance, wherein an "intermediary substance," as used herein is matter that exists directly between first pouch cell and second pouch cell. For example, and without limitation, first bottom surface 212 may contact second top surface 220 as a function of an insulative barrier, wherein an insulative barrier is described below, wherein insulative barrier concurrently contacts first bottom surface 212 and second top surface 220. In an embodiment, and without limitation, first pouch cell 204 and second pouch cell 216 may be aligned along a vertical axis. As used in this disclosure a "vertical axis" is an axis that extends from a bottom surface of a pouch cell to a top surface of a pouch cell. In an embodiment, and without limitation, first pouch cell 204 and second pouch cell 228 may be aligned along vertical axis such that first bottom surface 212 of first pouch cell 204 and second bottom surface 224 of second pouch cell 228 are in contact.

With continued reference to FIG. 2, battery pack 200 includes an insulative barrier 228. As used in this disclosure an "insulative barrier" is a barrier and/or layer of material and/or object that reduces a heat transfer between the first pouch cell and one or more extraneous elements, wherein an "extraneous element," as used herein, is an object and/or material that differs from the first pouch cell. Insulative barrier 228 is located between first pouch cell 204 and second pouch cell 216. For example, and without limitation, insulative barrier 228 may reduce a heat transfer between first pouch cell 204 and second pouch cell 216, wherein second pouch cell 216 may be the extraneous element. As a further non-limiting example, insulative barrier 228 may reduce a heat transfer between first pouch cell 204 and an object and/or material located external to battery pack 200 such as a lift component, circuitry, heat source, lift component, fuselage, computing device, and the like thereof. In an embodiment, and without limitation, insulative barrier may be composed of one or more ablative resins and/or carbon fiber elements, wherein ablative resins are described below, and wherein carbon fiber elements are described below. Insulative barrier 228 is configured to produce an ablative residue. As used in this disclosure an "ablative residue" is a material and/or object that is formed as a function of an ablation process, wherein an "ablation process," as used herein, is a chemical and/or physical process to modify and/or alter a cell ejecta and/or an ablative resin. For example, and without limitation, ablation process may include vaporizing, chipping, and/or eroding a cell ejecta and/or ablative residue. As a further non-limiting example, ablation process may include one or more processes such as but not limited to biological ablation, electro-ablation, laser ablation, antifouling, surface ablation, chemoablation, cryoablation, fulguration, radiofrequency ablation, microwave ablation, high-intensity focused ultrasound ablation, fireproofing ablation, and the like thereof. In an embodiment, and without limitation, ablative residue may include ash, dust, silica dust, heat, gas, vapors, dust grains, ice, and the like thereof. For example, and without limitation, ablation residue may include one or more heat vapors, gaseous vapors, and silica dust formed as a function of a cell ejecta interacting with an ablative resin. Additionally, without limitation, more disclosures related to the insulative barrier may be found in U.S. patent application Ser. No. 17/983, 775, entitled as "SYSTEM AND METHOD FOR A BATTERY ASSEMBLY", which is incorporated in its entirety herein by reference.

In an embodiment, and with continued reference to FIG. 2, ablative residue is produced as a function of a cell ejecta and an ablative resin. In some cases, cell ejecta may be ejected during thermal runaway of a battery cell. Alternatively or additionally, in some cases, cell ejecta may be ejected without thermal runaway of a battery cell. In some cases, cell ejecta may include lithium-based compounds. Alternatively or additionally, cell ejecta may include carbon-based compounds, such as without limitation carbonate esters. In some cases, cell ejecta may include cobalt-based compounds. In some cases, cell ejecta may include lead and/or lead-acid based compounds. Cell ejecta may include matter in any phase or form, including solid, liquid, gas, vapor, and the like. In some cases, cell ejecta may undergo a phase change, for example, and without limitation, cell ejecta may be vaporous as it is initially being ejected and then cool and condensed into a solid or liquid after ejection. As used in this disclosure, "ablative resin" is any material that aids in the removal and/or destruction of an object using one or more chemical and/or physical processes. In an embodiment, and without limitation, insulative barrier 228 may be composed of one or more ablative resins. For example, insulative barrier 228 may be composed of a first ablative resin and a second ablative resin. As a further non-limiting example, insulative barrier 228 may comprise a plurality of resins, such as but not limited to a first, second, third, and/or fourth ablative resin. For example, and without limitation, ablative resin may include one or more resins capable of vaporizing, chipping, and/or eroding a cell ejecta. As a non-limiting example, ablative resin may include one or more endothermic materials such as, but not limited to silicone materials, fire-resistance materials, organic rubber, organic resins, phenolic resins, silica dust, and the like thereof. As a further non-limiting example, ablative resin may include an epoxy novolac resin. As a further non-limiting example, ablative resin may include a fiberglass material arranged in a honeycomb matrix. As a further non-limiting example, ablative resin may include an epoxy phenol formaldehyde resin. As a further non-limiting example, ablative resin may include a carbon and/or carbon composite resin. As a further non-limiting example, ablative resin may include a carbon-carbon composite, carbon-phenolic composite, carbon-elastomeric composite, carbon-ceramic composite, and the like thereof. As a further non-limiting example, ablative resin may include a phenolic resin, wherein the phenolic resin may be filled with a mesoporous silica particle which may be synthesized from a tetraethyl orthosilicate. In an embodiment, and without limitation, ablative resin may include one or more materials comprising an attribute of a low thermal conductivity, high thermal resistance, high emissivity, good thermal stability, refractoriness, and the like thereof. In an embodiment, and without limitation, ablative resin may be layered such that a first layer that is exposed to cell ejecta may interact with the cell ejecta to produce ablative residue, wherein a second layer may be exposed as a function of the production of the ablative reside. In an embodiment, and without limitation, the exposure of the second layer may occur iteratively.

In an embodiment, and With continued reference to FIG. 2, insulative barrier 228 may comprise a carbon fiber element. As used in this disclosure a "carbon fiber element" is a material and/or object comprising an element of carbon. For example and without limitation, carbon fiber element may include one or more carbon fiber sheets, carbon fiber supported metals, carbon fiber bands, and the like thereof. In an embodiment, and without limitation, carbon fiber element may include one or more carbon fibers comprising 5-10 micrometers in diameter. In another embodiment, and without limitation, carbon fiber element may comprise high stiffness, high tensile strength, low weight to strength ratio, high chemical resistance, high temperature tolerance, and/or low thermal expansion. In an embodiment, and without limitation, carbon fiber element may include one or more composites such as a plastic resin, polymer, graphite, and the like thereof. Additionally or alternatively, insulative barrier 228 may comprise a foam element. As used in this disclosure a "foam element" is a material and/or object that is formed as a function of trapping one or more pockets of a gas and/or liquid in a solid. For example, and without limitation, foam element may include one or more liquid foams, solid foams, syntactic foams, integral skin foams, and the like thereof. In an embodiment, and without limitation, foam element may include a flame retardant foam, such as but not limited to a polyurethane foam. In another embodiment, and without limitation, foam element may be made from a polymer foam. In another embodiment, and without limitation, foam element may be made from a carbon fiber foam. Alternatively or additionally, foam element may include a non-uniform material, such as but not limited to a polyether ether ketone foam. As a further non-limiting example, foam element may include a non-newtonian polymer. Additionally or alternatively, insulative barrier 228 may include a polycarbonate polymer, polypropylene polymer, polystyrene polymer, urethane foam polymer, shock absorbing polymer, visco-elastic polymer, visco polymer, and the like thereof. As a further non-limiting example, foam element may include one or more materials that reduce one or more shock energies, vibration energies, frequencies, and the like thereof.

With continued reference to FIG. 2, battery pack 200 may include an ejecta barrier. In an embodiment, and without limitation, ejecta barrier may be located substantially between first pouch cell 204 and second pouch cell 216. As used in this disclosure, an "ejecta barrier" is any material or structure that is configured to substantially block, contain, or otherwise prevent passage of cell ejecta. For example, ejecta barrier may substantially encapsulate first pouch cell 204 and/or second pouch cell 216. In some cases, cell ejecta may be ejected during thermal runaway of a battery pouch cell. Alternatively or additionally, in some cases, cell ejecta may be ejected without thermal runaway of a battery pouch cell. In some cases, cell ejecta may include lithium-based compounds. Alternatively or additionally, cell ejecta may include carbon-based compounds, such as without limitation carbonate esters. Cell ejecta may include matter in any phase or form, including solid, liquid, gas, vapor, and the like. In some cases, cell ejecta may undergo a phase change, for example, and without limitation, cell ejecta may be vaporous as it is initially being ejected and then cool and condense into a solid or liquid after ejection. In an embodiment, and without limitation, ejecta barrier may be configured to prevent materials ejected from first pouch cell 204 from coming into contact with second pouch cell 216. For example, and without limitation, ejecta barrier is substantially impermeable to cell ejecta from first pouch cell 204 and/or one or more additional pouch cells. In some embodiments, ejecta barrier may include titanium. As used in this disclosure "substantially impermeable" is a characteristic of ejecta barrier that denotes the barrier prevents passage of one or more gases, fluids, and/or solids. In an embodiment, and without limitation, substantially impermeable may include a barrier being fully impermeable. For example, and without limitation, ejecta barrier may be fully impermeable as a function of restricting and/or preventing all passage of cell ejecta across a barrier. As a further non-limiting example, ejecta barrier may be impermeable as a function of blocking and/or halting all passage of cell ejecta across a barrier. In an embodiment, and without limitation, substantially impermeable may include ejecta barrier being selectively impermeable, wherein a magnitude and/or percentage of cell ejecta may be allowed to pass and/or permeate ejecta barrier. For example, and without limitation, ejecta barrier may be selectively impermeable for a fluid as a function of allowing 30% of a fluid to permeate, wherein ejecta barrier may be impermeable to a gas such as carbon monoxide, wherein no carbon monoxide may permeate ejecta barrier.

With continued reference to FIG. 2, ejecta barrier may include a carbon fiber element, wherein a carbon fiber element is described above. For example and without limitation, carbon fiber element may include one or more carbon fiber sheets, carbon fiber supported metals, carbon fiber bands, and the like thereof. In an embodiment, and without limitation, carbon fiber element may include one or more carbon fibers comprising 6-20 micrometers in diameter. In another embodiment, and without limitation, carbon fiber element may comprise high stiffness, high tensile strength, low weight to strength ratio, high chemical resistance, high temperature tolerance, and/or low thermal expansion. In an embodiment, and without limitation, carbon fiber element may include one or more composites such as a plastic resin, polymer, graphite, and the like thereof. In some cases, ejecta barrier may include at least a one of a lithophilic or a lithophobic material or layer, configured to absorb and/or repel lithium-based compounds. In some cases, ejecta barrier may comprise a lithophilic metal coating, such as silver or gold. In some cases, ejecta barrier may be flexible and/or rigid. In some cases, ejecta barrier may include a sheet, a film, a foil, or the like. For example in some cases, ejecta barrier may be between 35 and 6,000 micrometers thick. In some cases, ejecta barrier may have a nominal thickness of about 3 mm. Alternatively or additionally, in some cases, ejecta barrier may include rigid and/or structural elements, for instance which are solid. Rigid ejecta barriers may include metals, composites and the like. In some cases, ejecta barrier may be further configured to structurally support first pouch cell 204 and/or second pouch cell 216. For example in some cases, first pouch cell 204 and/or second pouch cell 216 may be mounted to a rigid ejecta barrier.

With continued reference to FIG. 2, battery pack 200 includes a vent 232. In an embodiment, and without limitation, vent 232 may be configured to vent ablative residue from first pouch cell 204. In another embodiment, and without limitation, vent 232 may be configured to vent ablative residue from second pouch cell 216. In another embodiment, and without limitation, vent 232 may be configured to vent one or more cell ejecta from first pouch cell 204 and/or second pouch cell 216. In some cases, vent 232 may be configured to vent ablative residue along a flow path. Flow path may substantially exclude second pouch cell 216, for example fluids such as gases liquids, or any material that acts as a gas or liquid, flowing along the flow path may be cordoned away from contact with second pouch cell 216. For example flow path may be configured to not intersect with any surface of second pouch cell 216. As a further non-limiting example, flow path may be configured to extend from first pouch cell 204 to an exterior location. As used in this disclosure an "exterior location" is a location and/or place that exists outside of battery pack 200. In an embodiment, and without limitation, exterior location may include a location and/or place that exists outside of an aircraft, wherein an aircraft is described below, in reference to FIG. 4. Flow path may include any channel, tube, hose, conduit, or the like suitable for facilitating fluidic communication, for example with a pouch cell. In some cases, flow path may include a check valve. In some cases check valve may be configured to allow flow of fluids substantially only away from first pouch cell 204 and/or second pouch cell 216, while preventing back flow of vented fluid to first pouch cell 204 and/or second pouch cell 216.

In an embodiment, and With continued reference to FIG. 2, check valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring. According to some embodiments, vent 232 may have a vacuum applied to aid in venting of ablative residue. Vacuum pressure differential may range from 0.1" Hg to 36" Hg. In some cases, vent 232 may be configured to provide fluidic communication through ejecta barrier and/or first pouch and/or second pouch. In some cases, vent 232 may include a seam. Seam may be a seam of first pouch and/or second pouch. Alternatively or additionally; seam may be a seam of ejecta barrier.

With continued reference to FIG. 2, in some embodiments, vent 232 may include a pressure valve. For the purposes of this disclosure, a "pressure valve" is a valve that automatically opens when the pressure differential between the two sides of the pressure valve reaches a certain threshold value. In some embodiments, pressure valve may be a pressure disk. Pressure disk may be a rupture disk, pressure safety disk, burst disk, bursting disc, burst diaphragm, or the like. Pressure disk may have an unruptured and/or intact state and a ruptured state. Pressure disk may transition to its ruptured state when the pressure differential between the two sides of the membrane becomes too high. In the ruptured state of pressure disk, the membrane may be ruptured. As such, the membrane may no longer block fluid flow. Pressure disk membrane may be made from a variety of materials; the material chosen, and the thickness of the membrane would determine at what pressure differential pressure disk transitions from its unruptured state to its ruptured state. As a non-limiting example, the membrane may include graphite. As another non-limiting example, the membrane may include mica. As another non-limiting example, the membrane may include carbon steel. As another non-limiting example, the membrane may include stainless steel. As another non-limiting example, the membrane may include an alloy. The material must be chosen with reference to the specific performance characteristics desired as well as the specific implementation sought. In some embodiments, vent 232 may include an outlet filter. For the purposes of this disclosure, a "filter" is a porous device that stops objects of a certain size from passing through it. In some embodiments, the outlet filter may occupy the entirety of a cross section of vent 232 such that fluid must flow through it. As a non-limiting example, outlet filter may be a porous object configured to keep unwanted objects such as dirt, rocks, and debris, from entering and/or exiting vent 232. In some embodiments vent 232 may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring. In some embodiments, the vent disclosed herein may be consistent with vent 120. Additionally, without limitation, the vent disclosed herein may be consistent with a pack vent disclosed in U.S. patent application Ser. No. 17/983,664, filed on Nov. 9, 2022, entitled as "HEAT-DISSIPATING BATTERY PACK", which is incorporated in its entirety herein by reference.

With continued reference to FIG. 2, in some embodiments, first pouch cell 204 and/or second pouch cell 216 may include one or more Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. First pouch cell 204 and/or second pouch cell 216 may include lead-based batteries such as without limitation lead acid batteries and lead carbon batteries. First pouch cell 204 and/or second pouch cell 216 may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. patent applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference. Persons skilled in the art, upon reviewing the entirety of this disclosure, will be aware of various devices of components that may be used as a battery module. In some cases, battery pack 200 is constructed in a manner that vents ablative residue, while preventing ablative residue from one pouch cell from interacting with another pouch cell.

With continued reference to FIG. 2, battery pack 200 may comprise an outer casing 236. As used in this disclosure an "outer casing" is a compartment and/or chamber that may ensconce first pouch cell 204, second pouch cell 216, insulative barrier 228, and vent 232. In an embodiment, outer casing 236 may include one or more materials capable of protecting first pouch cell 204, second pouch cell 216, insulative barrier 228, and vent 232 located inside of the compartment and/or chamber. For example, and without limitation, a material may consist of wood, aluminum, steel, titanium, polymers, graphite-epoxy, composites, and the like thereof. As a further non, limiting example outer casing 236 may include a material such as polycarbonate, acrylonitrile butadiene styrene, polypropylene, high impact polystyrene, and the like thereof. In an embodiment, outer casing 236 may include a first parallel group. As used in this disclosure a "first parallel group" is a set of materials that encloses one or more vertical portions of the compartment. In an embodiment, and without limitation, first parallel group may include a set of side walls, such as a material that extends vertically from the ground to enclose a lateral and/or side section of outer casing 236. In an embodiment, and without limitation, first parallel group may be a continuous piece of material and/or a combination of a plurality of materials. First parallel group may be configured with a high compression strength element. As used in this disclosure a "high compression strength element" is an element that has a large hardness rating and/or resists being squeezed together. In an embodiment high compression strength element may be determined as a function of a Mohs scale. For example and without limitation, a high compression strength element may include a material that has a 9 mohs scale value. In yet another embodiment, high compression strength element may be determined as a function of a Vickers hardness test. For example and without limitation, a high compression strength element may include a material that has a 180HV30 HV value.

In an embodiment, and with continued reference to FIG. 2, outer casing 236 may include a second parallel group. As used in this disclosure a "second parallel group" is a set of materials that encloses one or more horizontal portions of the compartment. In an embodiment, and without limitation, second parallel group may include a set of horizontal walls, such as a material that extends horizontally along an upper portion and/or lower portion of the compartment. In an embodiment, and without limitation, second parallel group may be a continuous piece of material and/or a combination of a plurality of materials. Second parallel group may be configured with a high compression strength element. In yet another embodiment, high compression strength element may include one or more arrangements of materials such as a honeycomb arrangement. In yet another embodiment, high compression strength element may include one or more element such as a foam and/or polymer described below. For example, second parallel group may include a sheet of polypropylene that protects the compartment and or chamber from objects and/or the environment located above outer casing 236. For example, second parallel group may include a sheet of polypropylene that contacts a ground below outer casing 236.

With continued reference to FIG. 2, outer casing 236 may be configured in a concave orientation. As used in this disclosure a "concave orientation" is an orientation of first parallel group and/or second parallel group such that the one or more vertical and/or horizontal walls curve and/or hollow inwards. For example, and without limitation, concave orientation may include a plurality of side walls that curve inward towards first pouch cell, second pouch cell, and/or insulative barrier. Additionally or alternatively outer casing 236 may be configured in a convex orientation. As used in this disclosure a "convex orientation" is an orientation of first parallel group and/or second parallel group such that the one or more vertical and/or horizontal walls curve and/or hollow outwards. For example, and without limitation, convex orientation may include a plurality of side walls that curve outwards similar to the exterior of a circle and/or sphere.

With continued reference to FIG. 2, outer casing 236 may be configured to compress as a function of n applied force. As used in this disclosure an "applied force" is a force exerted on outer casing 236 as a function of one or more impacts and/or extraneous collisions. In an embodiment applied force may be exerted on outer casing 236 as a function of an aircraft crash and/or vehicular crash. First parallel group and/or second parallel group may be configured to compress as a function of absorbing a predetermined amount of force, wherein a predetermined amount of force may include an applied load magnitude concave orientation and/or convex orientation may be configured to maintain. For example, and without limitation, an applied load magnitude may act to increase the curvature of convex orientation and/or concave orientation as a function of compressing first parallel group and/or second parallel group due to the load exceeding the compressive strength of first parallel group and/or second parallel group. In another embodiment predetermined amount of force may include a suddenly applied load. For example, and without limitation, suddenly applied load may exceed the impact strength of first parallel group and/or second parallel group, wherein concave orientation and/or convex orientation compresses as a function of the suddenly applied load. In yet another embodiment, first parallel group and/or second parallel group may be configured to absorb a predetermined direction of force, wherein a predetermined direction of force may include a directional load and/or force acting on first parallel group and/or second parallel group. For example, and without limitation, a vertical direction of force may result in a compression of concave orientation and/or convex orientation at a specified magnitude of force, wherein a horizontal direction of force may result in a lesser and/or no compression of concave orientation and/or convex orientation. As a further non-limiting example, a horizontal direction of force may result in a compression of concave orientation and/or convex orientation at a specified magnitude of force, wherein a vertical direction of force may result in a lesser and/or no compression of concave orientation and/or convex orientation.

With continued reference to FIG. 2, battery pack 200 may additionally include a third pouch cell. Third pouch cell may include at least a third pair of electrodes, at least a third pair of foil tabs welded to the third electrodes, at least a third insulator layer located substantially between the at least a third pair of foil tabs, a third pouch substantially encompassing the at least a third pair of foil tabs and the at least a third separator layer, and a third electrolyte within the third pouch. In an embodiment, third pouch cell may include a third top surface and a third bottom surface, wherein the third pouch cell is aligned such that second bottom surface 224 is above third top surface, for example as described above. In some embodiments, third pouch cell may include a vent. The vent disclosed herein may be consistent with vent 120. Additionally or alternatively, battery pack 200 may additionally include a fourth pouch cell. Fourth pouch cell may include at least a fourth pair of electrodes, at least a fourth pair of foil tabs welded to the fourth electrodes, at least a fourth insulator layer located substantially between the at least a fourth pair of foil tabs, a fourth pouch substantially encompassing the at least a fourth pair of foil tabs and the at least a fourth separator layer, and a fourth electrolyte within the fourth pouch. In an embodiment, fourth pouch cell may include a fourth top surface and a fourth bottom surface, wherein the fourth pouch cell is aligned such that third bottom surface is above fourth top surface, for example as described above. In some embodiments, fourth pouch cell may include a vent. The vent disclosed herein may be consistent with vent 120. Additionally, without limitation, the vent disclosed herein may be consistent with a vent disclosed in U.S. patent application Ser. No. 17/983,664, filed on Nov. 9, 2022, entitled as "HEAT-DISSIPATING BATTERY PACK", which is incorporated in its entirety herein by reference. In an embodiment, and without limitation, battery pack 200 may include a plurality including any number of pouch cells. In some cases, each pouch cell of plurality of pouch cells is separated from adjacent pouch cells with at least an insulative barrier, wherein an insulative barrier is described above. Any pouch cell of plurality of pouch cells in battery pack may include any component described in this disclosure, for example without limitation vents, valves, and the like.

With continued reference to FIG. 2, battery pack 200 may include a sensor. Sensor may include a sensor suite, for example as described with reference to FIGS. 5-6 below. In some cases, sensor may be configured to sense battery pack data and transmit battery pack data to a data storage system, for example as described below in reference to FIGS. 5-6. Additionally or alternatively, battery pack 200 may be configured to power a propulsor component, wherein a propulsor component is described below in reference to FIG. 4.

Figure 3:
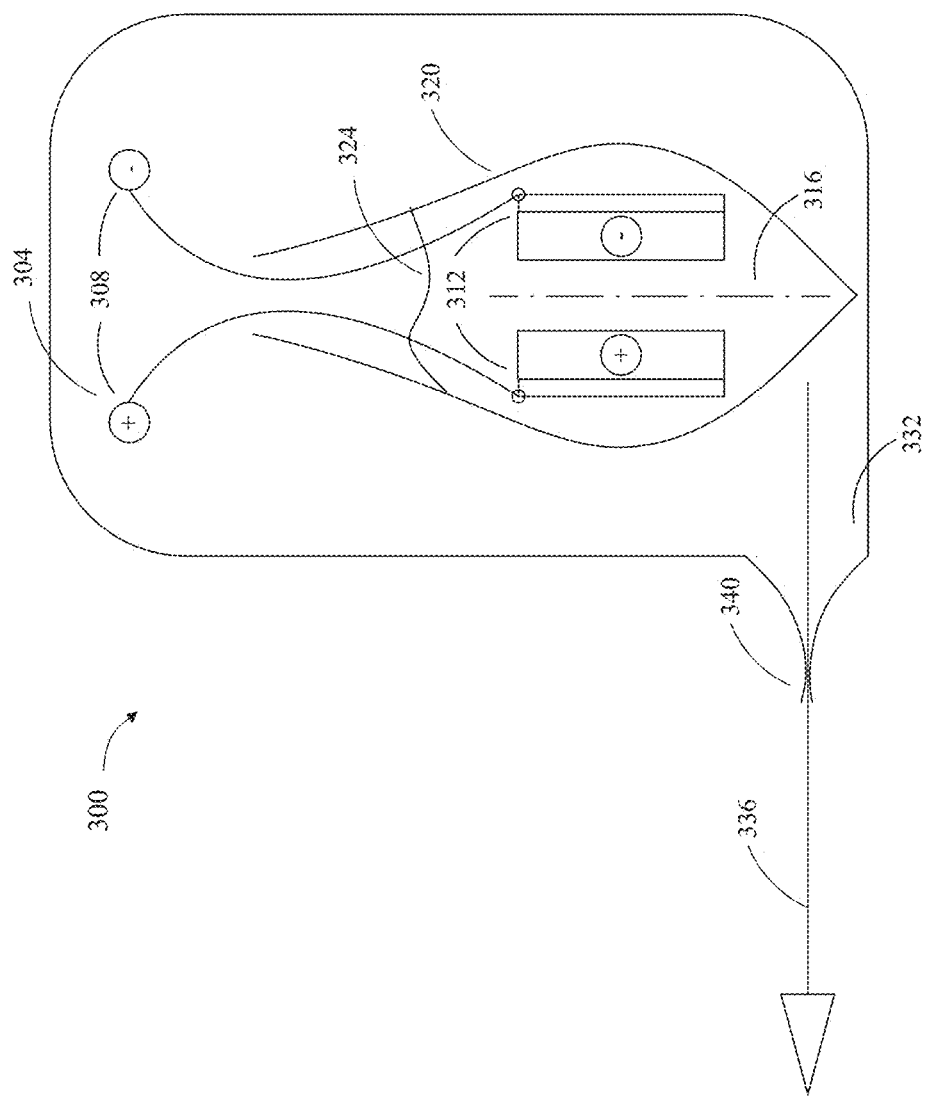
FIG. 3 is a block diagram of an exemplary battery cell.

Referring now to FIG. 3, a portion of an exemplary a battery cell 300 is illustrated. Battery cell 300 may include a pouch cell 304. Pouch cell 304 may include at least a pair of electrodes 308, at least a pair of foil tabs 312 in electrical communication with the electrodes 308, at least an insulator layer 316 located substantially between the at least a pair of foil tabs 312, a pouch 320 substantially encompassing the at least a pair of foil tabs 312 and at least a portion of the at least a separator layer 316, and a first electrolyte 324 within the pouch 320. Battery cell 300 may include an ejecta barrier 328. Ejecta barrier 328 may configured to prevent cell ejecta and/or ablative residue from one pouch cell 304 from reaching another pouch cell. In some cases, cell ejecta and/or ablative residue may include hot matter, which if left uncontained could transfer heat to other, e.g., neighboring, pouch cells. By preventing hot cell ejecta and/or ablative residue from reaching pouch cells ejecta barrier 328 may aid in preventing progression of thermal runaway between battery pouch cells within battery cell 300. In some cases, cell ejecta may include combustible materials, which if left uncontained could settle upon other, e.g., neighboring, pouch cells. Combustible materials once combustion conditions are met may combust generating an exothermic reaction, which can induce thermal runaway on nearby battery pouch cells. Combustion conditions can include presence of oxygen, fuel, spark, flash point, fire point, and/or autoignition temperature. Battery cell 300 may include a vent 332. Vent 332 may provide for cell ejecta flow along a flow path 336. Vent may include a check valve 340. Check valve 340 may be configured to allow for a flow path and/or fluid in substantially one direction, for example away from pouch cell 304. In some cases, vent 332 may be configured to allow for a venting of cell ejecta from pouch cell 304 without substantially any flow of cell ejecta toward the pouch cell 304, for example from other battery pouch cells.

According to some embodiments, battery pack 300 may be incorporated in an aircraft, for example a vertical take-off and landing aircraft.

Figure 4:
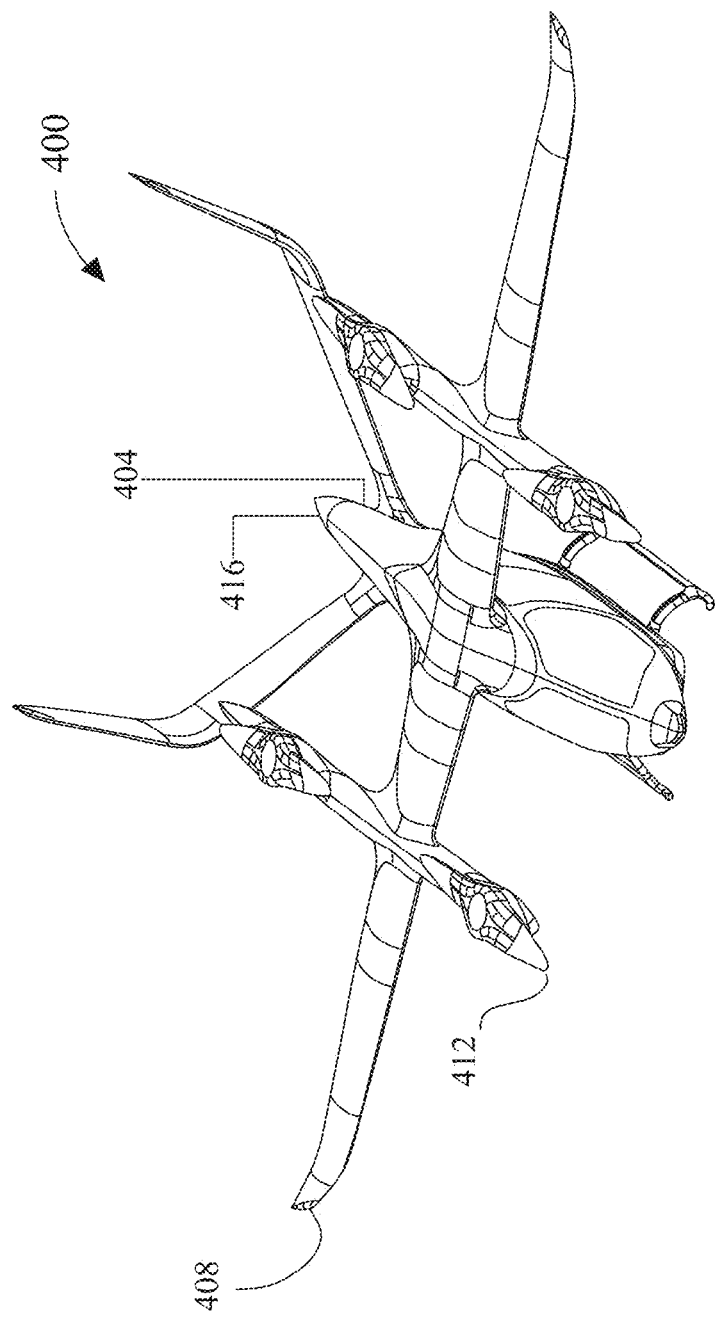
FIG. 4 is a schematic representation of an exemplary electric aircraft.

Referring now to FIG. 4, an exemplary embodiment of an electric aircraft 400 is illustrated. Electric aircraft 400 may include an electrically powered aircraft. In some embodiments, electrically powered aircraft may be an electric vertical takeoff and landing (eVTOL) aircraft. Electric aircraft 400 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

In an embodiment, and with continued reference to FIG. 4, electric aircraft 400 may include a fuselage 404. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 404 may comprise structural elements that physically support the shape and structure of an aircraft. Structural elements may take a plurality of forms, alone or in combination with other types. Structural elements may vary depending on the construction type of aircraft and specifically, the fuselage. Fuselage 404 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 404 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 404 orthogonal to the longitudinal (nose to tail) axis of the aircraft and forms the general shape of fuselage 404. A former may comprise differing cross-sectional shapes at differing locations along fuselage 404, as the former is the structural element that informs the overall shape of a fuselage 404 curvature. In embodiments, aircraft skin can be anchored to formers and strings such that the outer mold line of the volume encapsulated by the formers and stringers comprises the same shape as electric aircraft when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and with continued reference to FIG. 4, fuselage 404 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, fuselage 404 may include a semi-monocoque construction. Semi-monocoque construction, as used herein, is a partial monocoque construction, wherein a monocoque construction is describe above detail. In semi-monocoque construction, fuselage 404 may derive some structural support from stressed aircraft skin and some structural support from underlying frame structure made of structural elements. Formers or station frames can be seen running transverse to the long axis of fuselage 404 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

With continued reference to FIG. 4, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and with continued reference to FIG. 4, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 404. Monocoque comprises only structural skin, and in that sense, aircraft skin undergoes stress by applied aerodynamic fluids imparted by the fluid. Stress as used in continuum mechanics can be described in pound-force per square inch ($lbf/in^2$) or Pascals (Pa). In semi-monocoque construction stressed skin bears part of the aerodynamic loads and additionally imparts force on the underlying structure of stringers and formers.

With continued reference to FIG. 4, it should be noted that an illustrative embodiment is presented only, and this disclosure in no way limits the form or construction of electric aircraft. In embodiments, fuselage 404 may be configurable based on the needs of the electric per specific mission or objective. The general arrangement of components, structural elements, and hardware associated with storing and/or moving a payload may be added or removed from fuselage 404 as needed, whether it is stowed manually, automatedly, or removed by personnel altogether. Fuselage 404 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 404 may also be configurable to accept certain specific cargo containers, or a receptable that can, in turn, accept certain cargo containers.

With continued reference to FIG. 4, electric aircraft may include a plurality of laterally extending elements 408 attached to fuselage 404. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry comprises an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. In an embodiment, and without limitation, wing may include a leading edge. As used in this disclosure a "leading edge" is a foremost edge of an airfoil that first intersects with the external medium. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. As used in this disclosure a "trailing edge" is a rear edge of an airfoil. In an embodiment, and without limitation, trailing edge may include an edge capable of controlling the direction of the departing medium from the wing, such that a controlling force is exerted on the aircraft. Laterally extending element 408 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

With continued reference to FIG. 4, electric aircraft may include a plurality of lift components 412 attached to the plurality of extending elements 408. As used in this disclosure a "lift component" is a component and/or device used to propel a craft upward by exerting downward force on a fluid medium, which may include a gaseous medium such as air or a liquid medium such as water. Lift component 412 may include any device or component that consumes electrical power on demand to propel an electric aircraft in a direction or other vehicle while on ground or in-flight. For example, and without limitation, lift component 412 may include a rotor, propeller, paddle wheel, and the like thereof, wherein a rotor is a component that produces torque along a longitudinal axis, and a propeller produces torquer along a vertical axis. In an embodiment, lift component 412 may include a propulsor. In an embodiment, when a propulsor twists and pulls air behind it, it will, at the same time, push an aircraft forward with an equal amount of force. As a further non-limiting example, lift component 412 may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward.

In an embodiment, and with continued reference to FIG. 4, lift component 412 may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 412 may include a rotating power-driven hub, to which are attached several radial airfoil-section blades such that the whole assembly rotates about a longitudinal axis. The blades may be configured at an angle of attack. In an embodiment, and without limitation, angle of attack may include a fixed angle of attack. As used in this disclosure an "fixed angle of attack" is fixed angle between the chord line of the blade and the relative wind. As used in this disclosure a "fixed angle" is an angle that is secured and/or unmovable from the attachment point. For example, and without limitation fixed angle of attack may be 2.8° as a function of a pitch angle of 8.1° and a relative wind angle 5.3°. In another embodiment, and without limitation, angle of attack may include a variable angle of attack. As used in this disclosure a "variable angle of attack" is a variable and/or moveable angle between the chord line of the blade and the relative wind. As used in this disclosure a "variable angle" is an angle that is moveable from the attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, and with continued reference to FIG. 4, lift component 412 may be configured to produce a lift. As used in this disclosure a "lift" is a perpendicular force to the oncoming flow direction of fluid surrounding the surface. For example, and without limitation relative air speed may be horizontal to electric aircraft, wherein the lift force may be a force exerted in the vertical direction, directing electric aircraft upwards. In an embodiment, and without limitation, lift component 412 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. In an embodiment, and without limitation, lift component 412 may receive a source of power and/or energy from a power sources may apply a torque on lift component 412 to produce lift. As used in this disclosure a "power source" is a source that that drives and/or controls any component attached to electric aircraft. For example, and without limitation power source may include a motor that operates to move one or more lift components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

With continued reference to FIG. 4, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which electric aircraft may be incorporated.

In an embodiment, and with continued reference to FIG. 4, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

With continued reference to FIG. 4, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/948,140 both entitled "SYSTEM AND METHOD FOR HIGH ENERGY DENSITY BATTERY MODULE" by S. Donovan et al., which are incorporated in their entirety herein by reference.

With continued reference to FIG. 4, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

With continued reference to FIG. 4, another exemplary flight component 412 may include landing gear. Landing gear may be used for take-off and/or landing/Landing gear may be used to contact ground while aircraft is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

With continued reference to FIG. 4, aircraft may include a pilot control, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of lift components. For example and without limitation, collective control may alter and/or adjust the pitch angle of all of the main rotor blades collectively. For example, and without limitation pilot control may include a yoke control. As used in this disclosure a "yoke control" is a mechanical control of an aircraft to control the pitch and/or roll. For example and without limitation, yoke control may alter and/or adjust the roll angle of electric aircraft as a function of controlling and/or maneuvering ailerons. In an embodiment, pilot control may include one or more foot-brakes, control sticks, pedals, throttle levels, and the like thereof. In another embodiment, and without limitation, pilot control may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

With continued reference to FIG. 4, pilot control may be configured to modify a variable pitch angle. For example, and without limitation, pilot control may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control may modify the variable pitch angle from a first angle of 2.71° to a second angle of 3.82°. Additionally or alternatively, pilot control 412 may be configured to translate a pilot desired torque. For example, and without limitation, pilot control may translate that a pilot's desired torque for a propeller be 160 lb. ft. of torque. As a further non-limiting example, pilot control may introduce a pilot's desired torque for a propulsor to be 290 lb. ft. of torque. Additional disclosure related to pilot control may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

With continued reference to FIG. 4, aircraft 400 may include a loading system. A loading system may include a system configured to load an aircraft of either cargo or personnel. For instance, some exemplary loading systems may include a swing nose, which is configured to swing the nose of aircraft of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

With continued reference to FIG. 4, aircraft 400 may include a sensor. Sensor may be configured to sense a characteristic of pilot control. Sensor may be a device, module, and/or subsystem, utilizing any hardware, software, and/or any combination thereof to sense a characteristic and/or changes thereof, in an instant environment, for instance without limitation a pilot control, which the sensor is proximal to or otherwise in a sensed communication with, and transmit information associated with the characteristic, for instance without limitation digitized data. Sensor may be mechanically and/or communicatively coupled to aircraft 400, including, for instance, to at least a pilot control. Sensor may be configured to sense a characteristic associated with at least a pilot control. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor may include at least a geospatial sensor. Sensor may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft for both critical and non-critical functions. Sensor may be incorporated into vehicle or aircraft or be remote.

With continued reference to FIG. 4, in some embodiments, sensor may be configured to sense a characteristic associated with any pilot control described in this disclosure. Non-limiting examples of a sensor may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor may sense a characteristic as an analog measurement, for instance, yielding a continuously variable electrical potential indicative of the sensed characteristic. In these cases, sensor may additionally comprise an analog to digital converter (ADC) as well as any additionally circuitry, such as without limitation a Whetstone bridge, an amplifier, a filter, and the like. For instance, in some cases, sensor may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 400, for instance without limitation a computing system, a pilot display, and a memory component. Alternatively or additionally, sensor may sense a characteristic of a pilot control digitally. For instance in some embodiments, sensor may sense a characteristic through a digital means or digitize a sensed signal natively. In some cases, for example, sensor may include a rotational encoder and be configured to sense a rotational position of a pilot control; in this case, the rotational encoder digitally may sense rotational "clicks" by any known method, such as without limitation magnetically, optically, and the like.

With continued reference to FIG. 4, aircraft 400 may include at least a motor, which may be mounted on a structural feature of the aircraft. Design of motor may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor may include two main holes in top and bottom of mounting area to access bearing cartridge. Further, a structural feature may include a component of electric aircraft 400. For example, and without limitation structural feature may be any portion of a vehicle incorporating motor, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least lift component. Persons skilled in the art, upon reviewing the entirety of this disclosure, will be aware of various materials, combinations of materials, and/or constructions techniques.

With continued reference to FIG. 4, electric aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 4, a number of aerodynamic forces may act upon the electric aircraft during flight. Forces acting on electric aircraft 400 during flight may include, without limitation, thrust, the forward force produced by the rotating element of the electric aircraft and acts parallel to the longitudinal axis. Another force acting upon electric aircraft 400 may be, without limitation, drag, which may be defined as a rearward retarding force which is caused by disruption of airflow by any protruding surface of the electric aircraft 400 such as, without limitation, the wing, rotor, and fuselage. Drag may oppose thrust and acts rearward parallel to the relative wind. A further force acting upon electric aircraft 400 may include, without limitation, weight, which may include a combined load of the electric aircraft 400 itself, crew, baggage, and/or fuel. Weight may pull electric aircraft 400 downward due to the force of gravity. An additional force acting on electric aircraft 400 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 400 are designed to be as lightweight as possible. Reducing the weight of the aircraft and designing to reduce the number of components is essential to optimize the weight. To save energy, it may be useful to reduce weight of components of electric aircraft 400, including without limitation propulsors and/or propulsion assemblies. In an embodiment, motor may eliminate need for many external structural features that otherwise might be needed to join one component to another component. Motor may also increase energy efficiency by enabling a lower physical propulsor profile, reducing drag and/or wind resistance. This may also increase durability by lessening the extent to which drag and/or wind resistance add to forces acting on electric aircraft 400 and/or propulsors.

With continued reference to FIG. 4, electric aircraft may include at least a longitudinal thrust component 416. As used in this disclosure a "longitudinal thrust component" is a flight component that is mounted such that the component thrusts the flight component through a medium. As a non-limiting example, longitudinal thrust flight component 416 may include a pusher flight component such as a pusher propeller, a pusher motor, a pusher propulsor, and the like. Additionally, or alternatively, pusher flight component may include a plurality of pusher flight components. As a further non-limiting example, longitudinal thrust flight component may include a puller flight component such as a puller propeller, a puller motor, a puller propulsor, and the like. Additionally, or alternatively, puller flight component may include a plurality of puller flight components.

Figure 5:
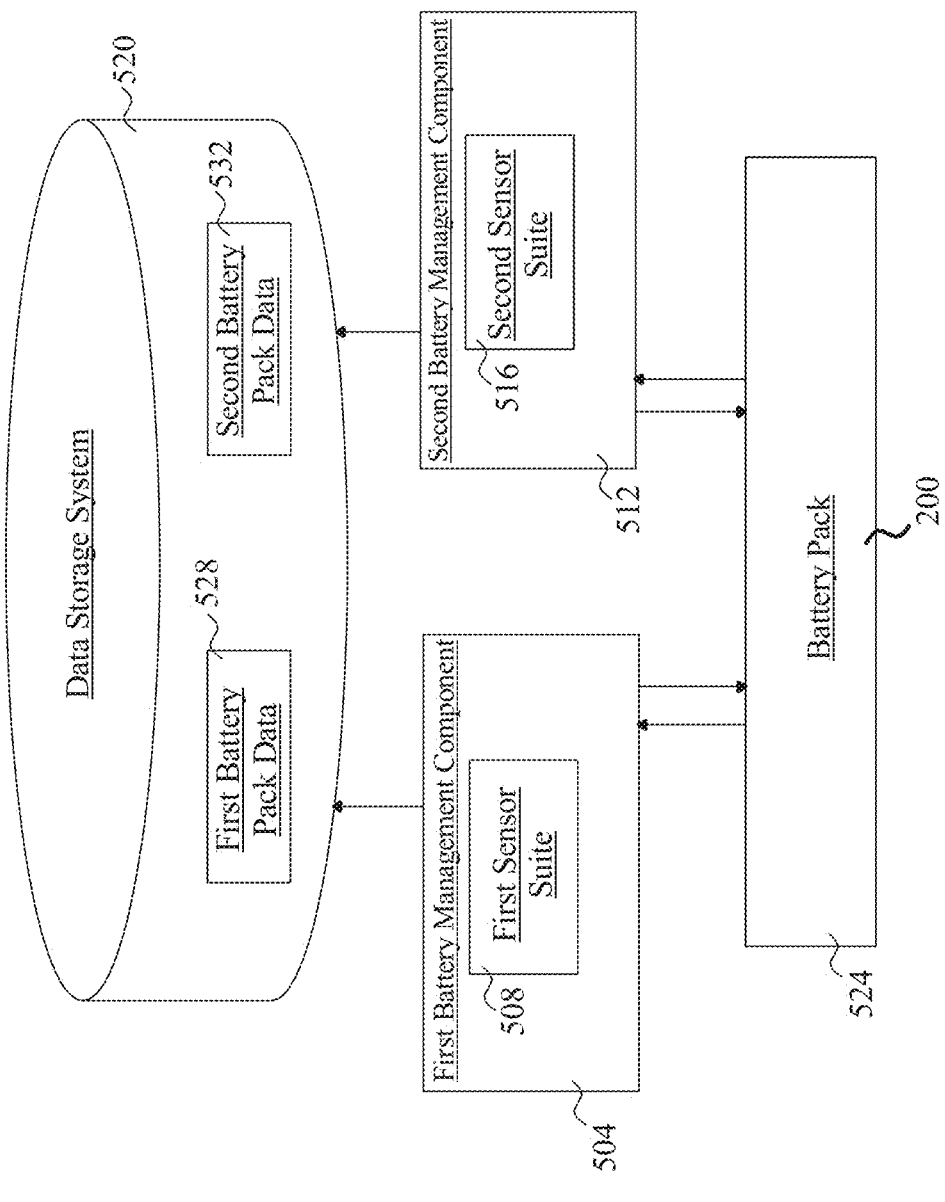
FIG. 5 is a block diagram of an exemplary battery management system.

Referring now to FIG. 5, an embodiment of battery management system 500 is presented. Battery management system 500 may be integrated in a battery pack configured for use in an electric aircraft. The battery management system 500 may be integrated in a portion of the battery pack or subassembly thereof. Battery management system 500 may include first battery management component 504 disposed on a first end of the battery pack. One of ordinary skill in the art will appreciate that there are various areas in and on a battery pack and/or subassemblies thereof that may include first battery management component 504. First battery management component 504 may take any suitable form. In a non-limiting embodiment, first battery management component 504 may include a circuit board, such as a printed circuit board and/or integrated circuit board, a subassembly mechanically coupled to at least a portion of the battery pack, standalone components communicatively coupled together, or another undisclosed arrangement of components; for instance, and without limitation, a number of components of first battery management component 504 may be soldered or otherwise electrically connected to a circuit board. First battery management component may be disposed directly over, adjacent to, facing, and/or near a battery module and specifically at least a portion of a battery pouch cell. First battery management component 504 includes first sensor suite 508. First sensor suite 508 is configured to measure, detect, sense, and transmit first plurality of battery pack data 528 to data storage system 520.

Referring again to FIG. 5, battery management system 500 may include a second battery management component 512. Second battery management component 512 is disposed in or on a second end of battery pack 524. Second battery management component 512 includes second sensor suite 516. Second sensor suite 516 may be consistent with the description of any sensor suite disclosed herein. Second sensor suite 516 is configured to measure second plurality of battery pack data 532. Second plurality of battery pack data 532 may be consistent with the description of any battery pack data disclosed herein. Second plurality of battery pack data 532 may additionally or alternatively include data not measured or recorded in another section of battery management system 500. Second plurality of battery pack data 532 may be communicated to additional or alternate systems to which it is communicatively coupled. Second sensor suite 516 includes a moisture sensor consistent with any moisture sensor disclosed herein, namely moisture sensor 504.

With continued reference to FIG. 5, first battery management component 504 disposed in or on battery pack 524 may be physically isolated from second battery management component 512 also disposed on or in battery pack 524. "Physical isolation", for the purposes of this disclosure, refer to a first system's components, communicative coupling, and any other constituent parts, whether software or hardware, are separated from a second system's components, communicative coupling, and any other constituent parts, whether software or hardware, respectively. First battery management component 504 and second battery management component 508 may perform the same or different functions in battery management system 500. In a non-limiting embodiment, the first and second battery management components perform the same, and therefore redundant functions. If, for example, first battery management component 504 malfunctions, in whole or in part, second battery management component 508 may still be operating properly and therefore battery management system 500 may still operate and function properly for electric aircraft in which it is installed. Additionally or alternatively, second battery management component 508 may power on while first battery management component 504 is malfunctioning. One of ordinary skill in the art would understand that the terms "first" and "second" do not refer to either "battery management components" as primary or secondary. In non-limiting embodiments, first battery management component 504 and second battery management component 508 may be powered on and operate through the same ground operations of an electric aircraft and through the same flight envelope of an electric aircraft. This does not preclude one battery management component, first battery management component 504, from taking over for second battery management component 508 if it were to malfunction. In non-limiting embodiments, the first and second battery management components, due to their physical isolation, may be configured to withstand malfunctions or failures in the other system and survive and operate. Provisions may be made to shield first battery management component 504 from second battery management component 508 other than physical location such as structures and circuit fuses. In non-limiting embodiments, first battery management component 504, second battery management component 508, or subcomponents thereof may be disposed on an internal component or set of components within battery pack 524.

Referring again to FIG. 5, first battery management component 504 may be electrically isolated from second battery management component 508. "Electrical isolation", for the purposes of this disclosure, refer to a first system's separation of components carrying electrical signals or electrical energy from a second system's components. First battery management component 504 may suffer an electrical catastrophe, rendering it inoperable, and due to electrical isolation, second battery management component 508 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of the first and second battery management components preventing electrical energy to be conducted through it, isolating the first and second battery management components from each other.

With continued reference to FIG. 5, battery management system 500 includes data storage system 520. Data storage system 520 is configured to store first plurality of battery pack data 528 and second plurality of battery pack data 532. Data storage system 520 may include a database. Data storage system 520 may include a solid-state memory or tape hard drive. Data storage system 520 may be communicatively coupled to first battery management component 504 and second battery management component 512 and may be configured to receive electrical signals related to physical or electrical phenomenon measured and store those electrical signals as first battery pack data 528 and second battery pack data 532, respectively. Alternatively, data storage system 520 may include more than one discrete data storage systems that are physically and electrically isolated from each other. In this non-limiting embodiment, each of first battery management component 504 and second battery management component 512 may store first battery pack data 528 and second battery pack data 532 separately. One of ordinary skill in the art would understand the virtually limitless arrangements of data stores with which battery management system 500 could employ to store the first and second plurality of battery pack data.

Referring again to FIG. 5, data storage system 520 may store first plurality of battery pack data 528 and second plurality of battery pack data 532. First plurality of battery pack data 528 and second plurality of battery pack data 532 may include total flight hours that battery pack 524 and/or electric aircraft have been operating. The first and second plurality of battery pack data may include total energy flowed through battery pack 524. Data storage system 520 may be communicatively coupled to sensors that detect, measure and store energy in a plurality of measurements which may include current, voltage, resistance, impedance, coulombs, watts, temperature, or a combination thereof. Additionally or alternatively, data storage system 520 may be communicatively coupled to a sensor suite consistent with this disclosure to measure physical and/or electrical characteristics. Data storage system 520 may be configured to store first battery pack data 528 and second battery pack data 532 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Data storage system 520 may store the first and second battery pack data that includes an upper voltage threshold and lower voltage threshold consistent with this disclosure. First battery pack data 528 and second battery pack data 532 may include a moisture level threshold. The moisture level threshold may include an absolute, relative, and/or specific moisture level threshold. Battery management system 500 may be designed to the Federal Aviation Administration (FAA)'s Design Assurance Level A (DAL-A), using redundant DAL-B subsystems.

Figure 6:
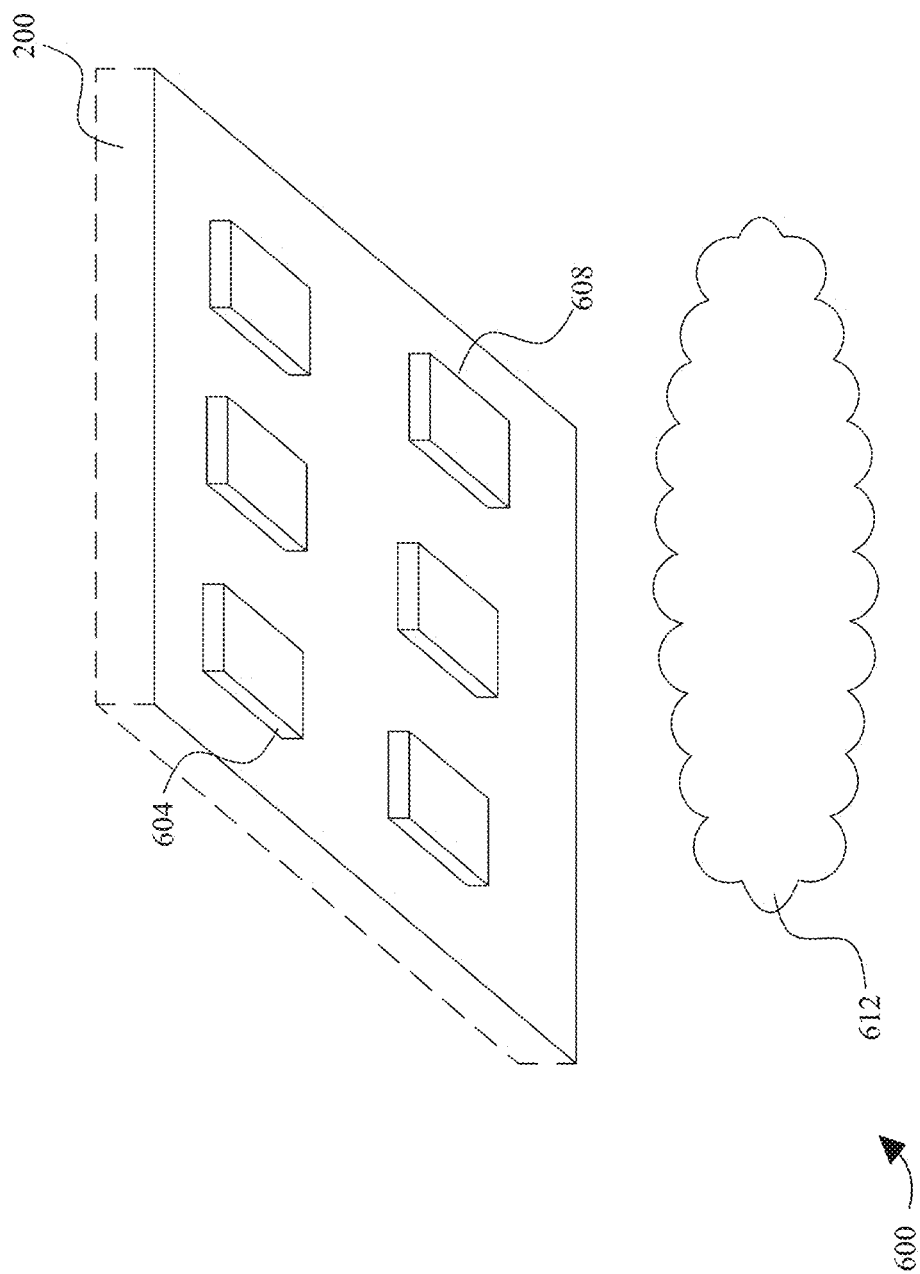
FIG. 6 is an illustration of a sensor suite in partial cross-sectional view.

Referring now to FIG. 6, an embodiment of sensor suite 600 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 424 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of battery management system 400 and/or user to detect phenomenon is maintained and in a non-limiting example, a user alter aircraft usage pursuant to sensor readings.

In an embodiment, and with continued reference to FIG. 6, sensor suite 600 may include a moisture sensor 604. "Moisture," as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 604 may be psychrometer. Moisture sensor 604 may be a hygrometer. Moisture sensor 604 may be configured to act as or include a humidistat. A "humidistat", for the purposes of this disclosure, is a humidity-triggered switch, often used to control another electronic device. Moisture sensor 604 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery pouch cell.

With continued reference to FIG. 6, sensor suite 600 may include electrical sensors 608. Electrical sensors 608 may be configured to measure voltage across a component, electrical current through a component, and resistance of a component. Electrical sensors 608 may include separate sensors to measure each of the previously disclosed electrical characteristics such as voltmeter, ammeter, and ohmmeter, respectively.

Alternatively or additionally, and with continued reference to FIG. 6, sensor suite 600 include a sensor or plurality thereof that may detect voltage and direct the charging of individual battery pouch cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 600 and/or a control circuit incorporated therein and/or communicatively connected thereto may be configured to adjust charge to one or more battery pouch cells as a function of a charge level and/or a detected parameter. For instance, and without limitation, sensor suite 600 may be configured to determine that a charge level of a battery pouch cell is high based on a detected voltage level of that battery pouch cell or portion of the battery pack. Sensor suite 600 may alternatively or additionally detect a charge reduction event, defined for purposes of this disclosure as any temporary or permanent state of a battery pouch cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 600 may include digital sensors, analog sensors, or a combination thereof. Sensor suite 600 may include digital-to-analog converters (DAC), analog-to-digital converters (ADC, A/D, A-to-D), a combination thereof, or other signal conditioning components used in transmission of a first plurality of battery pack data 428 to a destination over wireless or wired connection.

With continued reference to FIG. 6, sensor suite 600 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 600, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 6, sensor suite 600 may include a sensor configured to detect gas that may be emitted during or after a cell failure. "Cell failure", for the purposes of this disclosure, refers to a malfunction of a battery pouch cell, which may be an electrochemical cell, that renders the cell inoperable for its designed function, namely providing electrical energy to at least a portion of an electric aircraft. By products of cell failure 612 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 600, may be configured to detect combustible, flammable, toxic, oxygen depleted, a combination thereof, or another type of gas alone or in combination. The gas sensor that may be present in sensor suite 600 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 600 may include sensors that are configured to detect non-gaseous byproducts of cell failure 612 including, in non-limiting examples, liquid chemical leaks including aqueous alkaline solution, ionomer, molten phosphoric acid, liquid electrolytes with redox shuttle and ionomer, and salt water, among others. Sensor suite 600 may include sensors that are configured to detect non-gaseous byproducts of cell failure 612 including, in non-limiting examples, electrical anomalies as detected by any of the previous disclosed sensors or components.

With continued reference to FIG. 6, sensor suite 600 may be configured to detect events where voltage nears an upper voltage threshold or lower voltage threshold. The upper voltage threshold may be stored in data storage system 420 for comparison with an instant measurement taken by any combination of sensors present within sensor suite 600. The upper voltage threshold may be calculated and calibrated based on factors relating to battery pouch cell health, maintenance history, location within battery pack, designed application, and type, among others. Sensor suite 600 may measure voltage at an instant, over a period of time, or periodically. Sensor suite 600 may be configured to operate at any of these detection modes, switch between modes, or simultaneously measure in more than one mode. First battery management component 404 may detect through sensor suite 600 events where voltage nears the lower voltage threshold. The lower voltage threshold may indicate power loss to or from an individual battery pouch cell or portion of the battery pack. First battery management component 404 may detect through sensor suite 600 events where voltage exceeds the upper and lower voltage threshold. Events where voltage exceeds the upper and lower voltage threshold may indicate battery pouch cell failure or electrical anomalies that could lead to potentially dangerous situations for aircraft and personnel that may be present in or near its operation.

Figure 7:
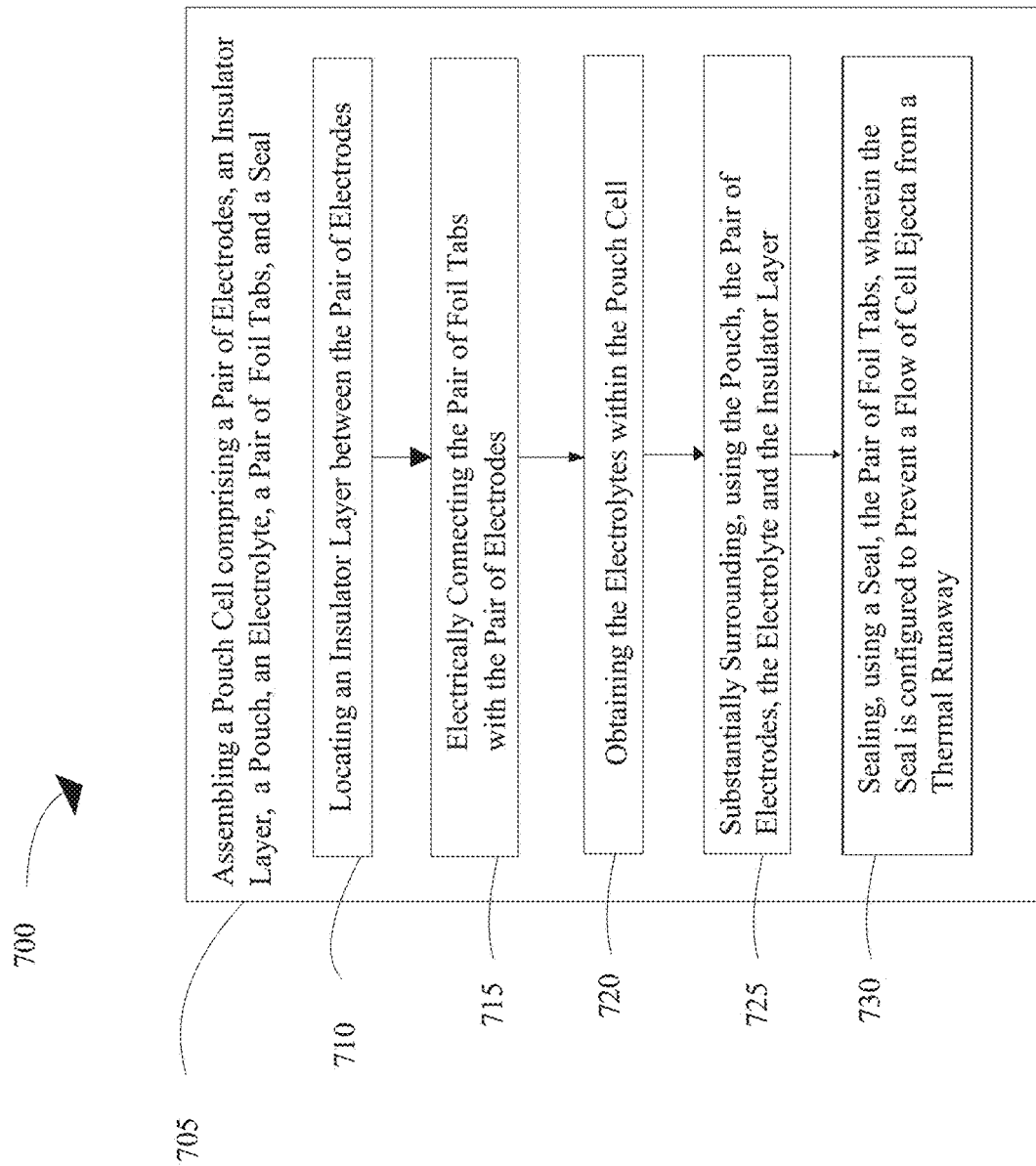
FIG. 7 is a flow diagram of an exemplary method of manufacture for a battery pack for an electric aircraft.

Referring now to FIG. 7, an exemplary method 700 of manufacture for a battery pack for an electric aircraft is illustrated. Method 700 may include step 705 of assembling a pouch cell comprising a pair of electrodes, an insulator layer, a pouch, an electrolyte, a pair of foil tabs, and a seal. In some embodiments, the pouch cell may further include a first side, wherein the first side may include the pair of foil tabs and the seal. In some embodiments, the pouch cell may further include a second side, wherein the second side comprises a vent. In some embodiments, the first side may be placed at an opposite side of the second side. In some embodiments, obtaining the pouch cell may include further steps. In some embodiments, step 705 may include step 710 of locating an insulator layer between the pair of electrodes. In some embodiments, step 705 may include step 715 of electrically connecting the pair of foil tabs with the pair of electrodes. In some embodiments, the pair of foil tabs may be electrically connected to a bus bar. In some embodiments, step 705 may include step 720 of obtaining the electrolytes within the pouch cell. In some embodiments, step 705 may include step 725 of substantially surrounding, using the pouch, the pair of electrodes, the electrolyte and the insulator layer. This may be implemented as disclosed with reference to FIGS. 1-6.

With continued reference to FIG. 7, in some embodiments, step 705 may include step 730 of sealing, using a seal, about the pair of foil tabs, wherein the seal is configured to prevent a flow of cell ejecta from a thermal runaway. In some embodiments, the seal may be thermally insulated. In some embodiments, the seal may be electrically insulated.

In some embodiments, the seal may be airtight. In some embodiments, the seal may include an intumescent material, wherein the intumescent material is configured to swell when the pouch cell experiences thermal runaway. In some embodiments, the seal is further configured to resist heat from the vent. In some embodiments, method 700 may further include resisting, using the seal, mechanical force, wherein the mechanical force may include abrasion of the cell ejecta discharged from the vent. This may be implemented as disclosed with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
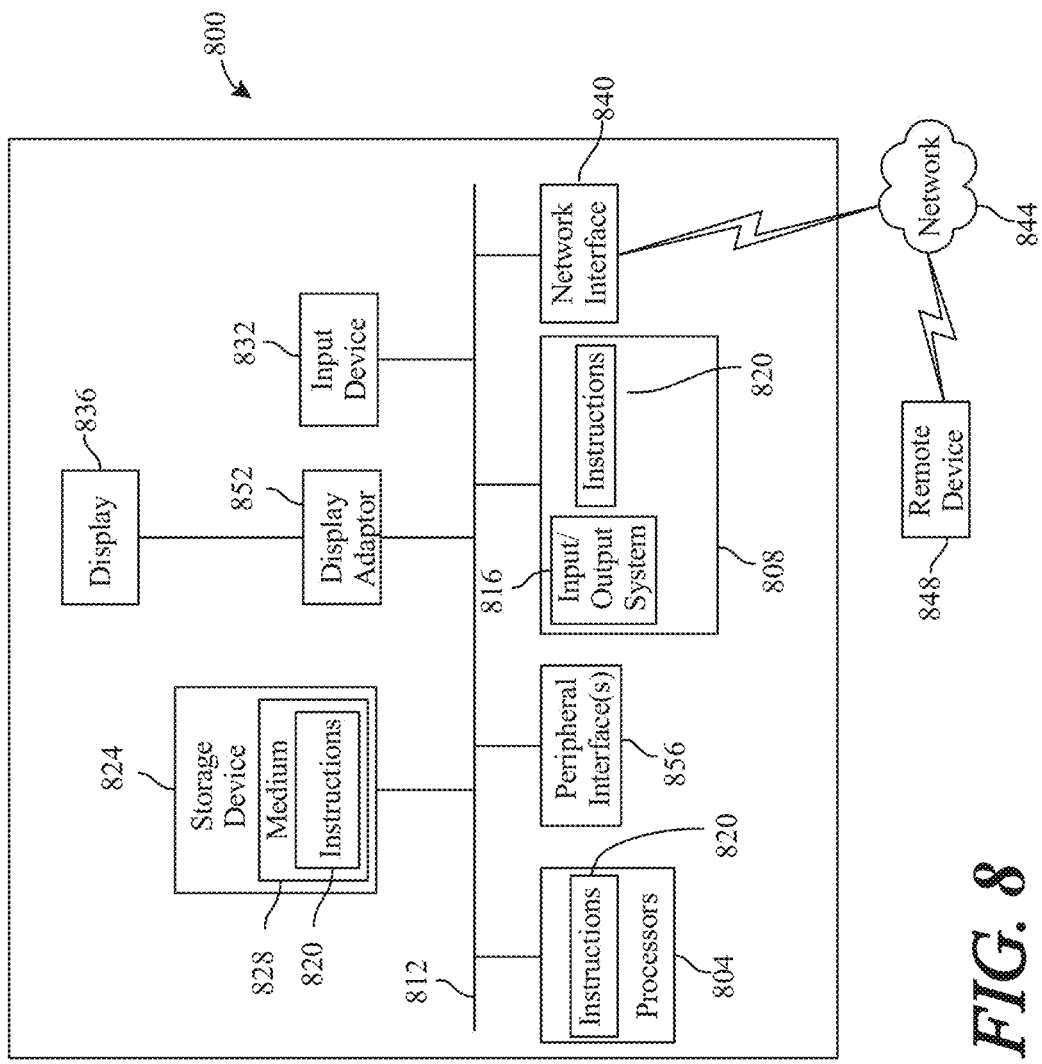
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A battery pack for use in an electric aircraft, wherein the battery pack comprises:
    a plurality of pouch cells within a sealed environment, wherein the plurality of pouch cells comprises:
        a first pouch cell and a second pouch cell, wherein the first pouch cell and the second pouch cell each comprise:
            a pair of electrodes, wherein the pair of electrodes is configured to carry electrical current;
            an insulator layer, the insulator layer located between the pair of electrodes;
            an electrolyte within the first pouch cell and the second pouch cell;
            a pouch, the pouch substantially surrounding the pair of electrodes, the electrolyte and the insulator layer;
            a pair of foil tabs in electrical communication with the pair of electrodes and emanating from the sealed environment; and
            a seal, wherein the seal is configured to:
                seal about the pair of foil tabs; and
                prevent a flow of cell ejecta from a thermal runaway; and
        an insulative barrier, wherein the insulative barrier is located between the first pouch cell and the second pouch cell and wherein the insulative barrier prevents a heat transfer between the first pouch cell and an extraneous element, wherein the extraneous element comprises at least the second pouch cell.

2. The battery pack of claim 1, wherein the pair of foil tabs is electrically connected to a bus bar.

3. The battery pack of claim 1, wherein the seal is thermally insulated.

4. The battery pack of claim 1, wherein the seal is electrically insulated.

5. The battery pack of claim 1, wherein the seal is airtight.

6. The battery pack of claim 5, wherein the seal comprises an intumescent material, wherein the intumescent material is configured to swell when the pouch cell experiences the thermal runaway.

7. The battery pack of claim 1, wherein the pouch cell further comprises: a first side, wherein the first side comprises the pair of foil tabs and the seal; and a second side, wherein the second side comprises a vent.

8. The battery pack of claim 7, wherein the first side is placed at an opposite side of the second side.

9. The battery pack of claim 7, wherein the seal is further configured to resist mechanical force, wherein the mechanical force comprises abrasion of the cell ejecta discharged from the vent.

10. The battery pack of claim 7, wherein the seal is further configured to resist heat from the vent.

11. A method of manufacturing a battery pack for use in an electric aircraft, wherein the method comprising:
assembling a plurality of pouch cells, each pouch cell comprising a pair of electrodes, an insulator layer, a pouch, an electrolyte, a pair of foil tabs, and a seal, wherein assembling the respective pouch cell comprises:
locating an insulator layer between the pair of electrodes;
electrically connecting the pair of foil tabs with the pair of electrodes; obtaining the electrolyte within the pouch cell;
substantially surrounding, using the pouch, the pair of electrodes, the electrolyte and the insulator layer; and
sealing, using a seal, the pair of foil tabs, wherein the seal is configured to prevent a flow of cell ejecta from a thermal runaway; and
locating an insulative barrier between a first pouch cell of the plurality of pouch cells and a second pouch cell of the plurality of pouch cells, wherein the insulative barrier prevents a heat transfer between the first pouch cell and an extraneous element, the extraneous element including at least the second pouch cell.

12. The method of claim 11, wherein the pair of foil tabs is electrically connected to a bus bar.

13. The method of claim 11, wherein the seal is thermally insulated.

14. The method of claim 11, wherein the seal is electrically insulated.

15. The method of claim 11, wherein the seal is airtight.

16. The method of claim 15, wherein the seal comprises an intumescent material, wherein the intumescent material is configured to swell when the pouch cell experiences the thermal runaway.

17. The method of claim 11, wherein the pouch cell further comprises: a first side, wherein the first side comprises the pair of foil tabs and the seal; and a second side, wherein the second side comprises a vent.

18. The method of claim 17, wherein the first side is placed at an opposite side of the second side.

19. The method of claim 17, further comprising:
resisting, using the seal, mechanical force, wherein the mechanical force comprises abrasion of the cell ejecta discharged from the vent.

20. The method of claim 17, wherein the seal is further configured to resist heat from the vent.

* * * * *